United States Patent
Shin

(10) Patent No.: US 10,444,901 B2
(45) Date of Patent: Oct. 15, 2019

(54) METHOD AND CIRCUIT FOR DRIVING TOUCH SENSOR AND DISPLAY DEVICE USING THE SAME

(71) Applicant: LG Display Co., Ltd., Seoul (KR)

(72) Inventor: Sunkyung Shin, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 200 days.

(21) Appl. No.: 15/639,097

(22) Filed: Jun. 30, 2017

(65) Prior Publication Data

US 2018/0004353 A1 Jan. 4, 2018

(30) Foreign Application Priority Data

Jun. 30, 2016 (KR) .................. 10-2016-0083085

(51) Int. Cl.
| | |
|---|---|
| *G06F 3/044* | (2006.01) |
| *G06F 3/041* | (2006.01) |
| *G02F 1/1333* | (2006.01) |
| *G02F 1/1343* | (2006.01) |

(52) U.S. Cl.
CPC .......... *G06F 3/0418* (2013.01); *G02F 1/1343* (2013.01); *G02F 1/13338* (2013.01); *G06F 3/044* (2013.01); *G06F 3/0412* (2013.01)

(58) Field of Classification Search
None
See application file for complete search history.

(56) References Cited

U.S. PATENT DOCUMENTS

| | | |
|---|---|---|
| 5,831,600 A | 11/1998 | Inoue et al. |
| 9,024,913 B1 | 5/2015 | Jung et al. |
| 9,357,045 B2 | 5/2016 | Oishi et al. |
| 9,442,611 B2 | 9/2016 | Noguchi et al. |
| 9,501,451 B2 | 11/2016 | Miyamoto |
| 9,563,323 B1 | 2/2017 | Miyamoto |
| 9,838,527 B2 | 12/2017 | Oishi et al. |
| 2011/0109568 A1* | 5/2011 | Wu ............... G06F 3/0412 345/173 |
| 2012/0217978 A1 | 8/2012 | Shen et al. |
| 2013/0211757 A1 | 8/2013 | Miyamoto |
| 2013/0244731 A1 | 9/2013 | Oishi et al. |

(Continued)

FOREIGN PATENT DOCUMENTS

| | | |
|---|---|---|
| JP | H09-325852 A | 12/1997 |
| JP | 2010-015262 A | 1/2010 |

(Continued)

OTHER PUBLICATIONS

Japanese Office Action, Japan Patent Office Application No. 2017-128190, dated Jun. 14, 2018, 9 pages.

*Primary Examiner* — Carl Adams
(74) *Attorney, Agent, or Firm* — Fenwick & West LLP

(57) ABSTRACT

A method and a circuit for driving a touch sensor measuring noise and a display device using the same are disclosed. The method of driving the touch sensor includes connecting sensor lines of a plurality of touch sensors to a sensing unit during a noise measurement portion, and driving the sensing unit at previously selected noise measurement frequencies in a state where the sensor lines are connected to the sensing unit or applying a signal of the noise measurement frequencies to the sensor lines to measure a noise of the touch sensors at each of the noise measurement frequencies.

16 Claims, 30 Drawing Sheets

(56) References Cited

U.S. PATENT DOCUMENTS

| | | |
|---|---|---|
| 2013/0293511 A1 | 11/2013 | Nam |
| 2014/0168151 A1 | 6/2014 | Noguchi et al. |
| 2015/0253926 A1 | 9/2015 | Ota et al. |
| 2016/0269541 A1 | 9/2016 | Oishi et al. |
| 2016/0378221 A1* | 12/2016 | Solven ............... G06K 9/00013 345/174 |
| 2017/0024039 A1 | 1/2017 | Miyamoto |
| 2017/0131829 A1 | 5/2017 | Takahashi et al. |

FOREIGN PATENT DOCUMENTS

| | | |
|---|---|---|
| JP | 2012-118957 A | 6/2012 |
| JP | 2013-196326 A | 9/2013 |
| JP | 2017-091224 A | 5/2014 |
| JP | 2014-119919 A | 6/2014 |
| JP | 2015-169986 A | 9/2015 |
| JP | 2015-210811 A | 11/2015 |

\* cited by examiner

METHOD AND CIRCUIT FOR DRIVING TOUCH SENSOR AND DISPLAY DEVICE USING THE SAME

This application claims the benefit of Korean Patent Application No. 10-2016-0083085 filed on Jun. 30, 2016, the entire contents of which is incorporated herein by reference for all purposes as if fully set forth herein.

BACKGROUND

Field of the Invention

The present disclosure relates to a method and a circuit for driving a touch sensor and a display device using the same.

Discussion of the Related Art

User interfaces (UIs) are configured to allow users to communicate with various electronic devices and to easily and comfortably control the electronic devices as they desire. Examples of UIs include a keypad, a keyboard, a mouse, an on-screen display (OSD), and a remote controller having an infrared communication function or a radio frequency (RF) communication function. User interface technology has continuously expanded to increase user's sensibility and handling convenience. UIs have been recently developed to include touch UIs, voice recognition UIs, 3D UIs, and the like.

A touch screen may be implemented as capacitive touch sensors. In addition, the touch screen may be implemented as resistive touch sensors, surface acoustic wave (SAW) type touch sensors, pressure type resistive touch sensors, infrared type touch sensors, and the like. The most important factor to determine a performance of the touch screen is a signal to noise ratio (often abbreviated to "SNR" or "S/N"). When noise introduced into a touch screen decreases, a value of a SNR increases. Hence, an operation margin of a touch driving circuit can increase, and sensitivity of touch sensing can be improved.

In order to improve the SNR, a method for accurately measuring the noise introduced into the touch sensor is important. Because the noise introduced into the touch sensor varies in real time depending on a surrounding environment, noise should to be continuously measured. A method for improving the SNR when a frequency of a touch sensor driving signal involves changing to avoid a frequency associated with high noise. An example of such method includes changing a frequency of a touch sensor depending on a level of noise, which is disclosed in Korean Patent Application Publication No. 10-2012-0057009 (Jun. 5, 2012) corresponding to the present applicant.

A method for measuring noise of a touch sensor may measure noise of a touch sensor at a particular position in an entire touch screen. However, this method cannot measure noise at positions other than a previously determined position. As a result of analyzing a performance of a touch screen in various product groups, noise of touch sensors appears in various forms in the entire touch screen.

SUMMARY

The present disclosure provides a method and a circuit for driving a touch sensor and a display device capable of rapidly and more accurately measuring noise of an entire touch screen.

In one aspect, there is provided a method of driving a touch sensor including connecting sensor lines of a plurality of touch sensors to a sensing unit during a noise measurement portion; and driving the sensing unit at previously selected noise measurement frequencies or applying a signal of the noise measurement frequencies to the sensor lines in a state where the sensor lines are connected to the sensing unit to measure a noise of the touch sensors at each of the noise measurement frequencies. The noise measurement portion includes a plurality of sub-noise measurement portions. Noise measurement frequencies in at least two of the sub-noise measurement portions are different from each other. One cycle, in which the same frequency among the noise measurement frequencies is repeated, is equal to or greater than one frame period of a display device.

The sensor lines are simultaneously connected to the sensing unit through a multiplexer between the sensor lines and the sensing unit.

The method further includes driving the sensing unit at a first frequency or applying a signal of the first frequency to the sensor lines during a touch input sensing portion and performing an analog amplification for amplifying a touch sensor signal with a variable amplification gain, an analog integration for integrating an analog amplification signal, a digital conversion for converting an analog integration signal into digital data, and a digital integration for integrating the digital data; and driving the sensing unit at the noise measurement frequencies including the first frequency or applying a signal of the noise measurement frequencies including the first frequency to the sensor lines during the noise measurement portion and performing the analog amplification, the analog integration, the digital conversion, and the digital integration at each of the noise measurement frequencies. A number of channels of the multiplexer simultaneously connected to the sensing unit during the noise measurement portion is more than a number of channels of the multiplexer simultaneously connected to the sensing unit during the touch input sensing portion. At least one of the amplification gain, a number of analog integrations, and a number of digital integrations has different values in the touch input sensing portion and the noise measurement portion.

In another aspect, there is provided a method of driving a display device including writing data of an input image to pixels of a display panel during a display period; and driving a sensing unit at previously selected noise measurement frequencies or applying a signal of the noise measurement frequencies to the sensor lines in a state where sensor lines of touch sensors are connected to the sensing unit to measure a noise of the touch sensors at each of the noise measurement frequencies during a noise measurement portion. Noise measurement frequencies in at least two of sub-noise measurement portions are different from each other. One cycle, in which the same frequency among the noise measurement frequencies is repeated, is equal to or greater than one frame period of the display device.

In yet another aspect, there is provided a touch sensor circuit including a touch sensor driver configured to drive a sensing unit at previously selected noise measurement frequencies or apply a signal of the noise measurement frequencies to the sensor lines in a state where sensor lines of touch sensors are connected to the sensing unit during a noise measurement portion and measure a noise of the touch sensors at each of the noise measurement frequencies. Noise measurement frequencies in at least two of sub-noise measurement portions are different from each other. One cycle, in which the same frequency among the noise measurement frequencies is repeated, is equal to or greater than one frame period of the display device.

In still yet another aspect, there is provided a display device including a display panel on which touch sensors and pixels are disposed, a display panel driver configured to write data of an input image to the pixels of the display panel during a display period, and a touch sensor driver configured to drive a sensing unit at previously selected noise measurement frequencies or apply a signal of the noise measurement frequencies to the sensor lines in a state where sensor lines of the touch sensors are connected to the sensing unit during a noise measurement portion and measure a noise of the touch sensors at each of the noise measurement frequencies. Noise measurement frequencies in at least two of sub-noise measurement portions are different from each other. One cycle, in which the same frequency among the noise measurement frequencies is repeated, is equal to or greater than one frame period of the display device.

BRIEF DESCRIPTION OF THE DRAWINGS

The accompanying drawings, which are included to provide a further understanding of the disclosure and are incorporated in and constitute a part of this specification, illustrate various embodiments and together with the description serve to explain the principles of the invention. In the drawings.

DETAILED DESCRIPTION OF THE EMBODIMENTS

Figure 1:
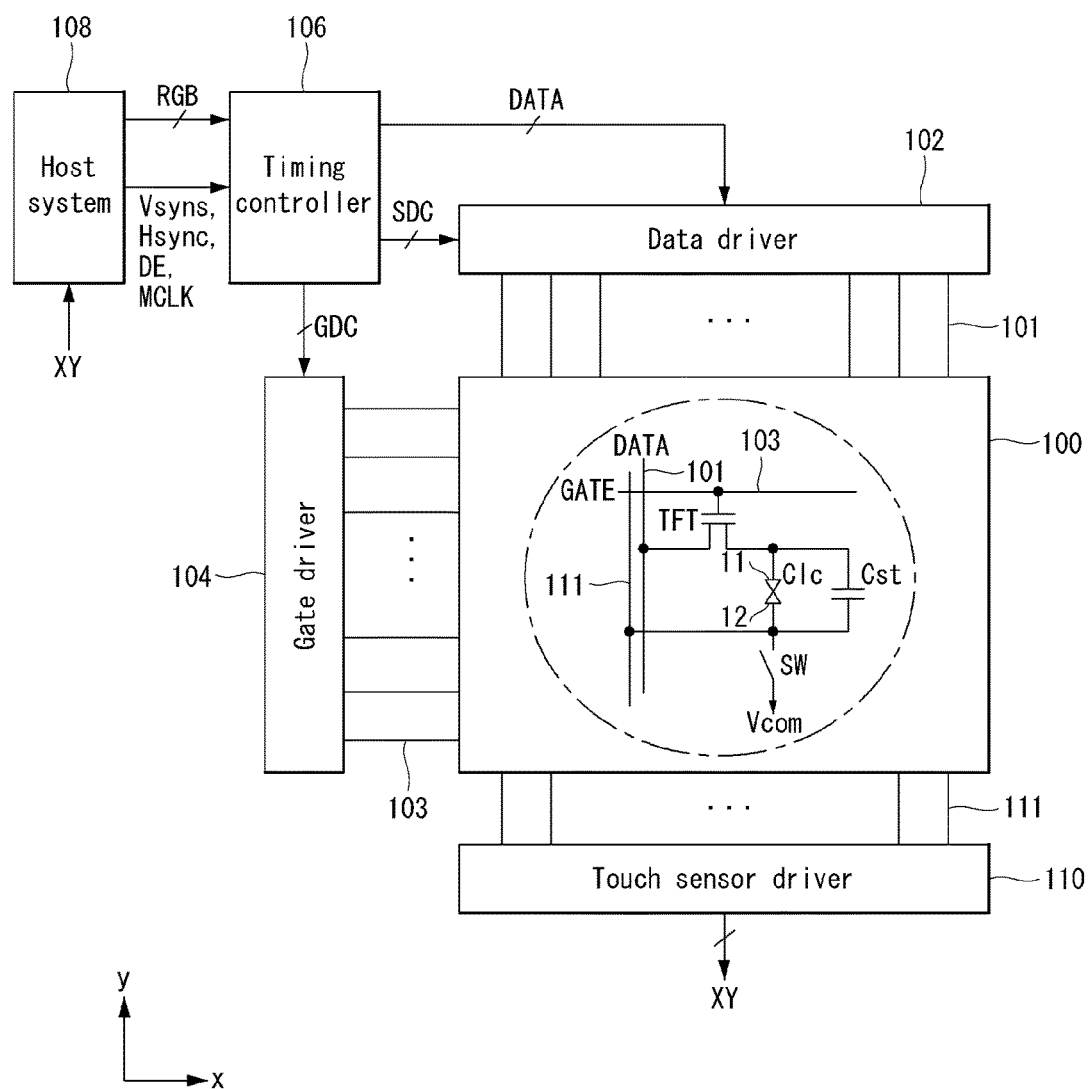
FIG. 1 illustrates a display device, according to an embodiment.

A display device according to embodiments herein may be implemented as a display device including a touch screen, for example, a flat panel display such as a liquid crystal display (LCD), a field emission display (FED), a plasma display panel (PDP), an organic light emitting diode (OLED) display, and an electrophoresis display (EPD). In the following description, embodiments will be described using a liquid crystal display as an example of a flat panel display. However, embodiments are not limited thereto, and other types of flat panel displays may be used instead.

A touch screen according to embodiments may be implemented as capacitive sensors. The capacitive sensor may be classified into a mutual capacitance touch sensor and a self-capacitance touch sensor.

The mutual capacitance touch sensor includes a mutual capacitance Cm between two electrodes Tx and Rx. A touch sensor driving circuit applies a touch sensor driving signal (or stimulation signal) to a Tx touch sensing line, receives charges of the mutual capacitance Cm through an Rx touch sensing line, and senses a touch input based on an amount of charge changed in the mutual capacitance Cm before and after the touch input. When a finger or a conductor approaches the mutual capacitance Cm, the mutual capacitance Cm is reduced. The touch sensor driving circuit senses a touch input using such principle.

The self-capacitance touch sensor includes a self-capacitance Cs formed in each of sensor electrodes. A touch sensor driving circuit supplies charges to the self-capacitance Cs and senses a touch input based on an amount of charge changed in the self-capacitance Cs before and after the touch input. When a finger or a conductor approaches the self-capacitance Cs, the self-capacitance Cs increases. The touch sensor driving circuit senses a touch input using such principle.

Embodiments supply a touch sensor driving signal to touch sensors to sense a touch input and measure a first noise of the touch sensors while the touch sensor driving signal is not supplied to the touch sensors. Embodiments measure a second noise of the touch sensors while the touch sensor driving signal is not supplied to the touch sensors, compare the first noise with the second noise, and control an operating frequency of a driving circuit for measuring noise of the touch sensors based on the comparison.

The touch sensors according to embodiments may be implemented as in-cell touch sensors and may be embedded in a pixel array. However, embodiments are not limited thereto. When the touch sensors are embedded in the pixel array, the display device according to embodiments may time-divide one frame period into at least one display period and at least one touch sensor driving period, in order to time-division drive pixels of the pixel array and the touch sensors. However, embodiments are not limited thereto. Further, when a touch sensor electrode and a common electrode for display are simultaneously used in the display device according to embodiments, the display device may simultaneously drive the in-cell touch sensors and the pixels.

Noise may be applied to the touch sensors due to external high-frequency interference, such as a transceiver, or other causes. During the touch sensor driving period, a touch input is sensed through the touch sensors. At least one of a plurality of touch sensor driving periods includes a noise measurement portion.

Embodiments short-circuit two or more touch sensors during the noise measurement portion and simultaneously measure noise through the two or more touch sensors, thereby measuring noise of all the touch sensors during a short period of the noise measurement portion.

Reference will now be made in detail to various embodiments, examples of which are illustrated in the accompanying drawings. Wherever possible, the same reference numbers will be used throughout the drawings to refer to the same or like parts. Detailed descriptions of known arts will be omitted if such may mislead the understanding of the various embodiments.

Referring to FIGS. 1 to 4C, a display device according to an embodiment includes a display panel 100, a display driving circuit (102, 104, and 106), and a touch sensor driver 110. A touch screen TSP includes capacitive touch sensors.

The display panel 100 includes a pixel array for displaying an input image. Touch sensors Cs for implementing the touch screen TSP are disposed on the display panel 100. The touch sensors Cs sense a touch input using a mutual capacitance Cm or a self-capacitance Cs.

Figure 2:
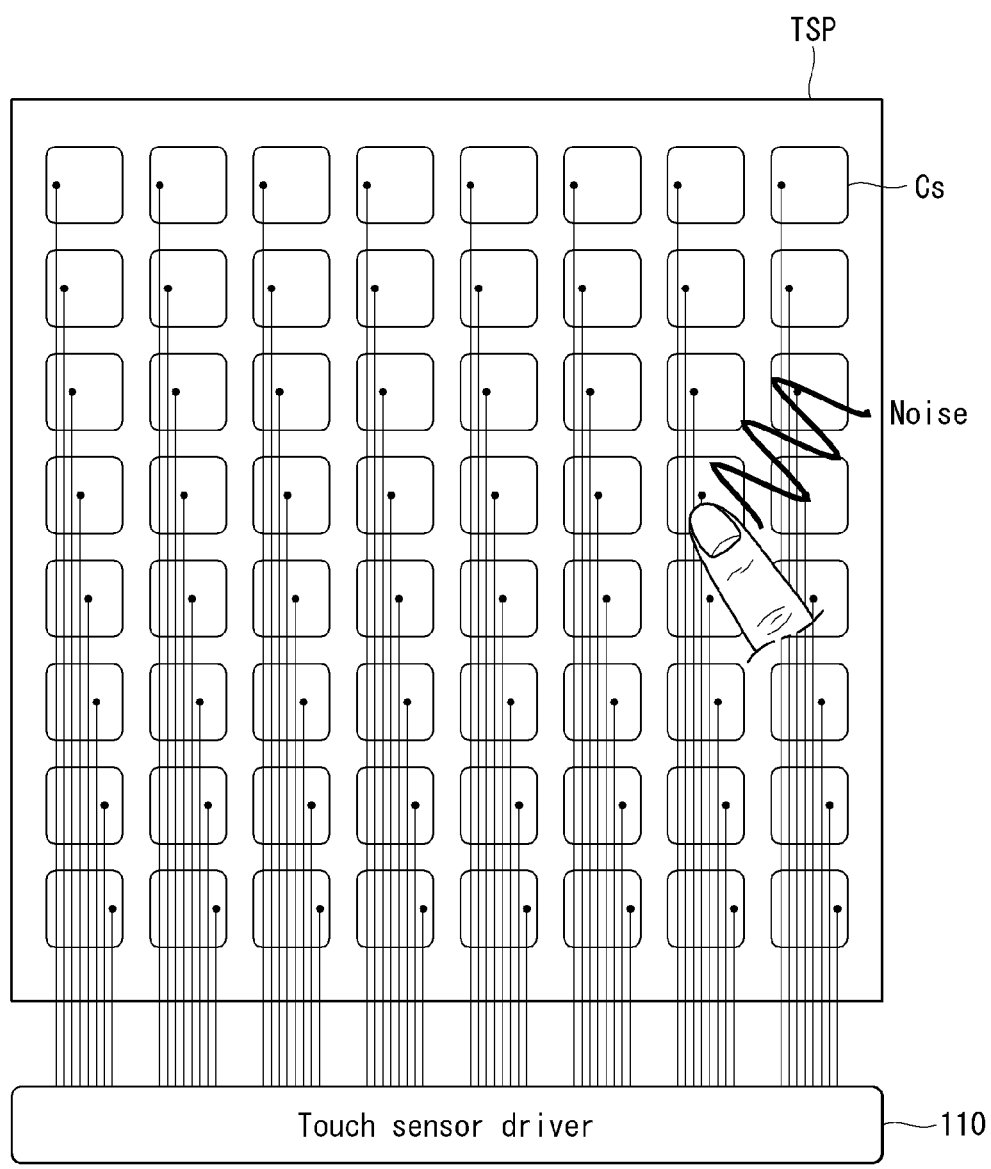
FIG. 2 illustrates an electrode pattern of self-capacitance touch sensors, according to an embodiment.
Figure 3:
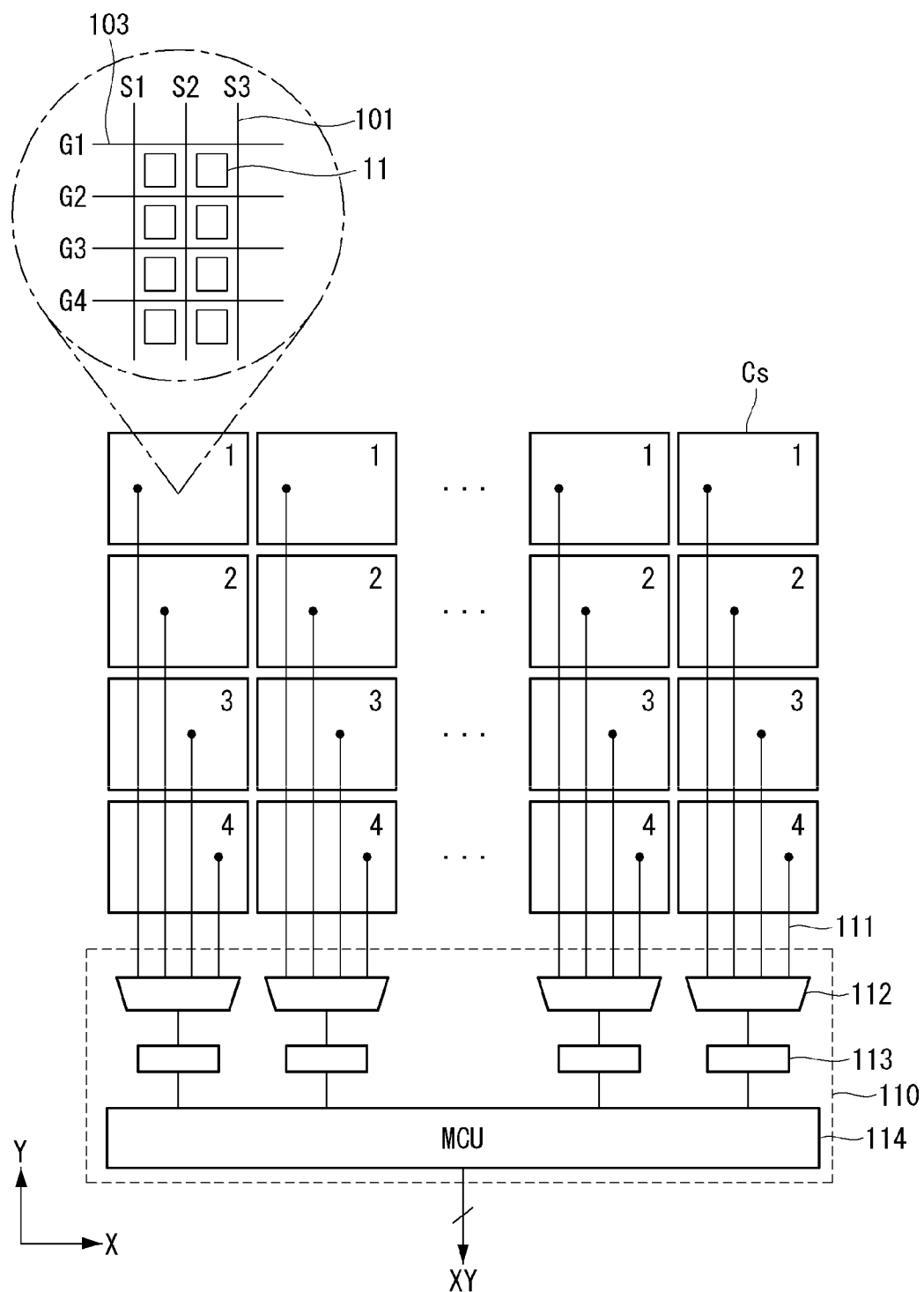
FIG. 3 illustrates configuration of a touch sensor driver, according to an embodiment.

The touch sensors Cs may be attached to the display panel 100. In some embodiments, the touch sensors, together with the pixel array, may be formed on a lower substrate of the display panel 100 and embedded in the display panel 100 in an in-cell form. In the following description, embodiments will describe touch sensors embedded in the display panel 100 by way of example, but are not limited thereto. FIGS. 2 and 3 illustrate self-capacitance touch sensors embedded in the display panel 100 by way of example.

The pixel array of the display panel 100 includes pixels defined by data lines 101 and gate lines 103. Each pixel includes a red subpixel R, a green subpixel G, and a blue subpixel B in order to implement color. Each pixel may further include a white subpixel W. Each pixel includes a thin film transistor (TFT) disposed at intersections of the data line 101 and the gate line 103, a pixel electrode 11 supplied with a data voltage through the TFT, a common electrode 12 divided by an electrode pattern of the touch sensors Cs, and a storage capacitor Cst that is connected to the pixel electrode 11 and holds a voltage of a liquid crystal cell Clc.

Sensor lines 111 for connecting the touch sensors Cs to the touch sensor driver 110 are disposed on the pixel array of the display panel 100.

In the self-capacitance touch sensor, the sensor lines 111 are lines disposed in parallel with one another in the same direction. In the self-capacitance touch sensor, the sensor lines 111 may be connected to electrodes of the touch sensors Cs, respectively.

In the mutual capacitance touch sensor, the sensor lines 111 may include Tx lines and Rx lines. The Tx lines and the Rx lines may be connected to the electrodes of the touch sensors Cs.

Liquid crystal molecules of the liquid crystal cell Clc are driven by an electric field generated by a difference between a data voltage applied to the pixel electrode 11 and a common voltage Vcom applied to the electrode of the touch sensor Cs, and thus control a transmittance of the pixels in accordance with data of an input image.

Black matrixes, color filters, etc. may be formed on an upper substrate of the display panel 100. A lower substrate of the display panel 100 may be configured in a COT (color filter on TFT) structure or a TOC (TFT on color filter) structure. In this instance, the color filters may be formed on the lower substrate of the display panel 100.

Polarizing plates are respectively attached to the upper substrate and the lower substrate of the display panel 100. Alignment layers for setting a pre-tilt angle of liquid crystals are respectively formed on the inner surfaces contacting the liquid crystals in the upper substrate and the lower substrate of the display panel 100. A column spacer is formed between the upper substrate and the lower substrate of the display panel 100 to keep a cell gap of a liquid crystal layer substantially constant.

A backlight unit may be disposed under a back surface of the display panel 100. The backlight unit may be implemented as one of an edge type backlight unit and a direct type backlight unit and irradiates light onto the display panel 100.

The display panel 100 may be implemented in any known mode including a twisted nematic (TN) mode, a vertical alignment (VA) mode, an in-plane switching (IPS) mode, a fringe field switching (FFS) mode, etc. The backlight unit may be omitted in a self-emission display device such as an organic light emitting diode (OLED) display.

Figure 4A:
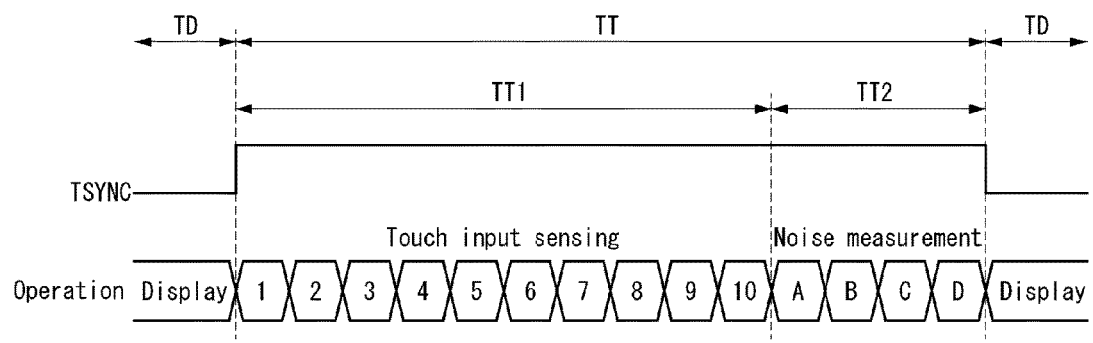
FIGS. 4A to 4C illustrate a display period and a touch sensor driving period, according to an embodiment.
Figure 4B:
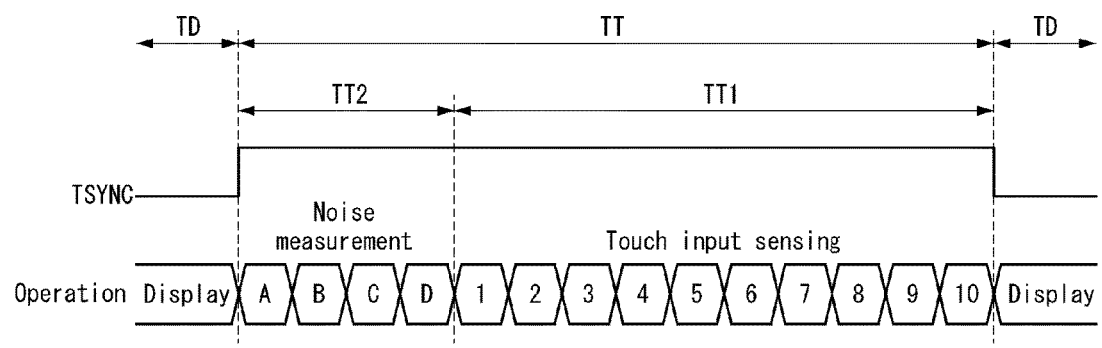
Figure 4C:
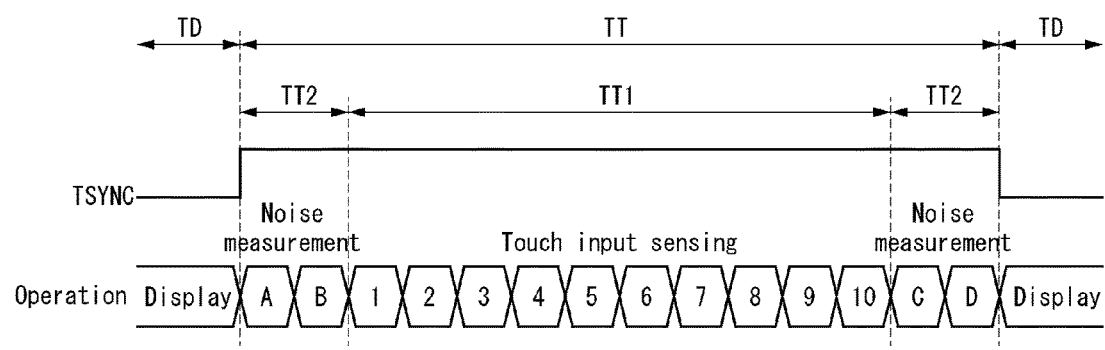

When the touch sensors Cs are embedded in the pixel array, as shown in FIGS. 4A to 4C, one frame period is time-divided into one or more display periods TD in which the pixels are driven for display, and one or more touch sensor driving periods TT in which the touch sensors Cs are driven for touch sensing. The touch sensors Cs supply the common voltage Vcom to the pixels during the display period TD and sense a touch input during the touch sensor driving period TT. The touch sensor driving period TT is divided into a touch input sensing portion TT1 in which a touch input is sensed, and a noise measurement portion TT2 in which noise of the touch sensors Cs is measured.

The display driving circuit (102, 104, and 106) writes data of an input image to the pixels of the display panel 100. The display driving circuit (102, 104, and 106) includes a data driver 102, a gate driver 104, and a timing controller 106.

The data driver 102 converts digital video data DATA of an input image received from the timing controller 106 into positive and negative analog gamma compensation voltages and outputs a data voltage. The data driver 102 then supplies the data voltage to the pixels through the data lines 101.

The gate driver 104 sequentially supplies a gate pulse (or scan pulse) synchronized with the data voltage to the gate lines 103 and selects lines of the display panel 100 to which the data voltage is applied. The gate pulse swings between a gate high voltage VGH and a gate low voltage VGL. The gate high voltage VGH is set to a voltage greater than a threshold voltage of a TFT, and the gate low voltage VGL is set to a voltage lower than the threshold voltage of the TFT. When the gate high voltage VGH is applied to a gate of each TFT of the pixel array, the TFT is turned on and supplies the data voltage from the data line 101 to the pixel electrode 11.

The timing controller 106 transmits data RGB of an input image received from a host system 108 to the data driver 102. The timing controller 106 may generate white data W from the data RGB for each pixel using a known algorithm.

The timing controller 106 receives timing signals, such as a vertical sync signal Vsync, a horizontal sync signal Hsync, a data enable signal DE, and a main clock MCLK, from the host system 108 in synchronism with the data RGB of the input image and controls operation timings of the data driver 102, the gate driver 104, and the touch sensor driver 110 using the timing signals. In FIG. 1, "SDC" is a data timing signal for controlling operation timing of the data driver 102, and "GDC" is a gate timing signal for controlling operation timing of the gate driver 104. The timing controller 106 may generate a touch sync signal TSYNC (see FIGS. 16 and 17) for defining the display period TD and the touch sensor driving period TT using an input timing signal and synchronize the data driver 102, the gate driver 104, and the touch sensor driver 110 with one another.

The host system 108 may be one of a television system, a set-top box, a navigation system, a DVD player, a Blu-ray player, a personal computer (PC), a home theater system, a phone system, and other systems that include or operate in conjunction with a display. The host system includes a system-on chip (SoC), in which a scaler is embedded, and converts digital video data of an input image into a format suitable for displaying the input image on the display panel 100. The host system 108 transmits the digital video data of the input image and the timing signals Vsync, Hsync, DE, and MCLK to the timing controller 106. The host system 108 executes an application associated with coordinate information (e.g., an X-Y coordinate point) of a touch input received from the touch sensor driver 110.

During the touch input sensing portion TT1, the touch sensor driver 110 converts an amount of charge changed in the touch sensors Cs before and after a touch input into digital data and generates touch raw data (hereinafter, referred to as "touch data"). The touch sensor driver 110 executes a known touch sensing algorithm and calculates coordinate values of each touch input. The touch sensing algorithm compares the touch data with a predetermined threshold value, determines a touch input based on a result of the comparison, adds an identification code and coordinate information XY to each touch input, and transmits the identification code and the coordinate information XY to the host system 108.

During the noise measurement portion TT2, the touch sensor driver 110 measures noise of the touch sensors Cs while changing a frequency of the touch sensors Cs. The touch sensor driver 110 selects a frequency having a small noise and generates a touch sensor driving signal at the selected frequency having the small noise in the touch input sensing portion TT1.

The touch sensor driver 110 includes a plurality of multiplexers (MUX) 112, a plurality of sensing unit 113, a touch sensor controller 114, and the like.

The multiplexer 112 selects the sensor lines 111 connected to the touch sensors Cs. Each multiplexer 112 sequentially connects the sensor lines 111 to an input terminal of the sensing unit 113 through MUX channels under the control of the touch sensor controller 114 during the touch input sensing portion TT1, thereby reducing the number of reception channels of the touch sensor driver 110. The multiplexers 112 simultaneously connect a plurality of MUX channels to the input terminals of the sensing units 113 during the noise measurement portion TT2. The MUX channel refers to a current path between the sensor lines 111 and the sensing unit 113 in each multiplexer 112.

The sensing unit 113 is driven at a first frequency during a first period to perform analog amplification for amplifying a touch sensor signal with an amplification gain defined by a parameter, analog integration for integrating an analog amplification signal, digital conversion for converting an analog integration signal into digital data, and digital integration for integrating the digital data. The sensing unit 113 is driven at different frequencies including the first frequency during a second period to perform the analog amplification, the analog integration, the digital conversion, and the digital integration on the touch sensor signal. The number of channels (i.e., the number of MUX channels) of the multiplexer 112 simultaneously connected to the sensing unit 113 during the second period is more than the number of channels of the multiplexer 112 simultaneously connected to the sensing unit 113 during the first period. At least one of the amplification gain, the number of analog integrations, and the number of digital integrations is controlled differently in the first period and the second period. The first period is the touch input sensing portion TT1, and the second period is the noise measurement portion TT2.

For example, an amplification gain in the second period may be controlled to be less than an amplification gain in the first period. The number of analog integrations in the second period may be controlled to be less than the number of analog integrations in the first period. The number of digital integrations in the second period may be controlled to be more than the number of digital integrations in the first period. A control method of the sensing unit 113 in the second period may vary depending on a design method of the sensing unit 113.

Each sensing unit 113 receives an amount of charge of the touch sensors Cs through the sensor lines 111 connected to the sensing unit 113 via the multiplexer 112. The number of MUX channels simultaneously connected to the sensing unit 113 during the noise measurement portion TT2 is more than the number of MUX channels simultaneously connected to the sensing unit 113 during the touch input sensing portion TT1. Hence, when the sensing units 113 are driven under the same conditions during the touch input sensing portion TT1 and the noise measurement portion TT2, an output voltage of an integrator in the noise measurement portion TT2 is saturated, and a noise measurement range is reduced. In order to solve such a problem, embodiments may differently set a parameter for controlling operating characteristics of the sensing units 113 in the touch input sensing portion TT1 and the noise measurement portion TT2.

Figure 6:
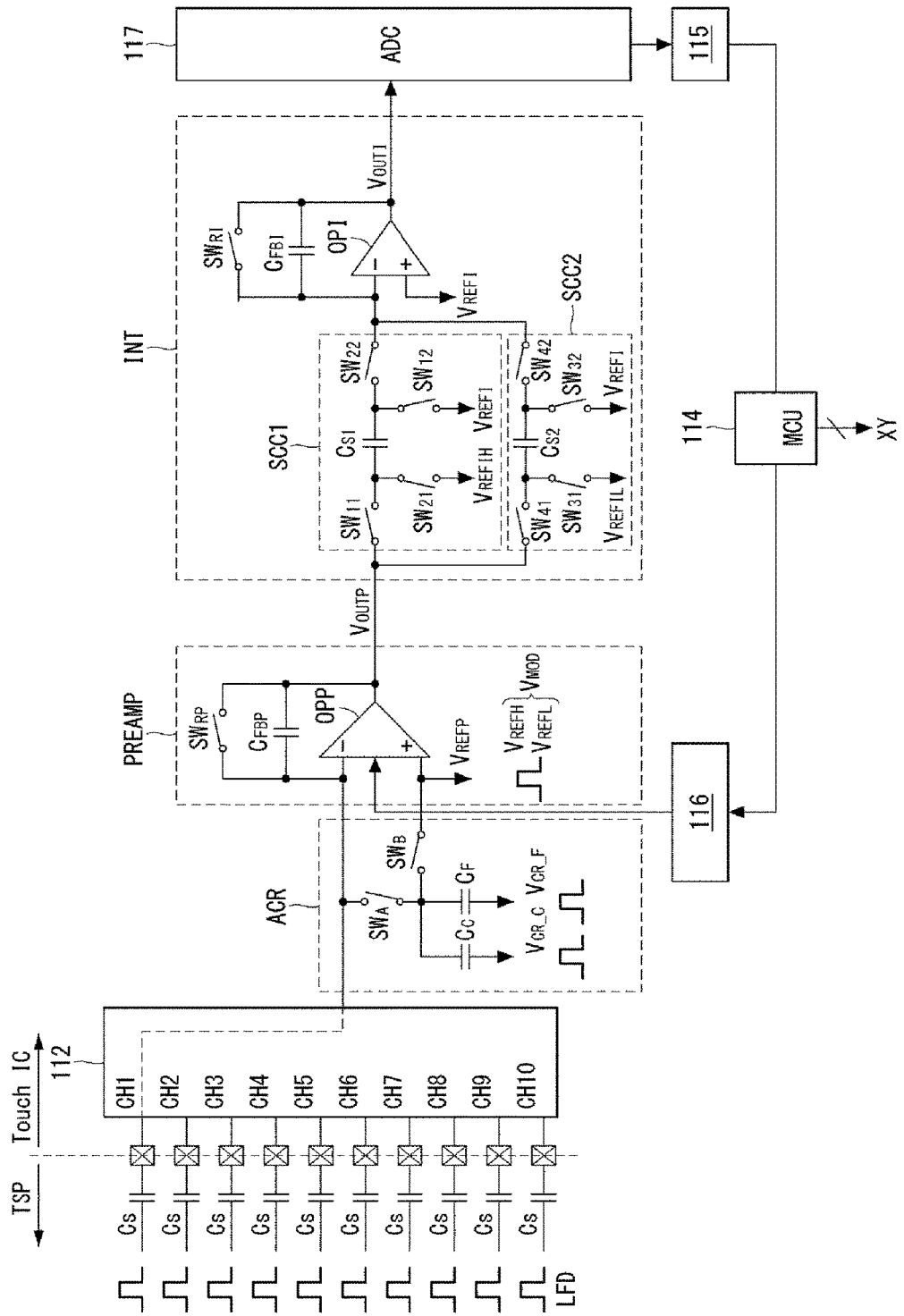
FIG. 6 is a circuit diagram illustrating a circuit configuration of a sensing unit and an operation of a touch input sensing portion, according to an embodiment.

Referring to FIG. 6, the sensing unit 113 includes a variable gain amplifier PREAMP connected to an output terminal of the multiplexer 112, an analog integrator INT connected to an output terminal of the variable gain amplifier PREAMP, an analog-to-digital converter (ADC) 117 connected to an output terminal of the analog integrator INT, a digital integrator 115 connected to an output terminal of the ADC 117, and the like. The sensing unit 113 amplifies an amount of charge of the touch sensors Cs received from the multiplexer 112 through the variable gain amplifier PREAMP and integrates the amount of charge using the analog integrator INT. Further, the sensing unit 113 supplies an output voltage of the analog integrator INT to the ADC 117. The ADC 117 converts a voltage received from the analog integrator INT into a digital value and accumulates digital data received from the ADC 117 by a predetermined number of times using the digital integrator 115 to output touch data.

A gain of the variable gain amplifier PREAMP, the number of integrations of the analog integrator INT, and the number of integrations of the digital integrator 115 are defined by a previously set parameter. Values of the parameter are set independently in the touch input sensing portion TT1 and the noise measurement portion TT2. Thus, the gain of the variable gain amplifier PREAMP, the number of integrations of the analog integrator INT, and the number of integrations of the digital integrator 115 may be set differently in the touch input sensing portion TT1 and the noise measurement portion TT2.

In the noise measurement portion TT2, the number of MUX channels connected to each sensing unit 113 increases. As a result, because an amount of charge of the touch sensors Cs received to each sensing unit 113 increases, it is difficult to accurately measure noise. That is, because the voltage of the integrator is saturated even if a small amount of charge of the touch sensors Cs is received, it is difficult to accurately measure noise. For example, when the voltage is accumulated to the integrator under the same conditions (for example, the same gain of the amplifier and the same number of analog integrations) in the touch input sensing portion TT1 and the noise measurement portion TT2, the output voltage of the analog integrator is saturated even if noise increases in the noise measurement portion TT2. Hence, digital data values output from the ADC may be saturated.

Embodiments may increase the noise measurement range by further reducing the gain of the variable gain amplifier PREAMP or further reducing the number of integrations of the analog integrator INT in the noise measurement portion TT2 as compared to the touch input sensing portion TT1. Alternatively, embodiments may increase the noise measurement range by performing together the two methods, namely, reducing the gain of the variable gain amplifier PREAMP and reducing the number of integrations of the analog integrator INT in the noise measurement portion TT2. Embodiments herein may increase the digital data value by reducing the number of integrations of the analog integrator INT and increasing the number of integrations of the digital integrator 115 in the noise measurement portion TT2.

The touch sensor controller 114 executes a touch sensing algorithm in order to determine a touch input. The touch sensing algorithm compares touch data, received from the ADC 117 during the touch input sensing portion TT1, with a predetermined threshold value, determines a position of the touch input based on a result of the comparison, and outputs an identification code and coordinate information XY for each touch input.

The touch sensor controller 114 differently controls the driving conditions of the sensing units 113 in the touch input sensing portion TT1 and the noise measurement portion TT2 using a previously set parameter. The touch sensor controller 114 controls the sensing units 113 to change a touch sensor driving frequency according to a predetermined rule during the noise measurement portion TT2.

The touch sensor driving frequency is an operating frequency of the sensing units 113 or a frequency of a touch sensor driving signal $V_{MOD}$ (see FIG. 6). The touch sensor driving signal $V_{MOD}$ supplies charge of the touch sensors Cs. The operating frequency of the sensing unit 113 is a driving frequency of the variable gain amplifier PREAMP and the analog integrator INT. The operating frequency of the sensing unit 113 may be adjusted by frequencies of switching elements $SW_{RP}$, $SW_{RP}$, and SW1 to SW4 in the variable gain amplifier PREAMP and the analog integrator INT. The switching elements $SW_{RP}$, $SW_{RP}$, and SW1 to SW4 are synchronized with one another at the same frequency and are turned on and off. The touch sensor driving frequency described in the following noise measurement method of the touch sensors indicates an operating frequency of the switching elements $SW_{RP}$, $SW_{RP}$, and SW1 to SW4.

The touch sensor controller 114 may be implemented as a microcontroller unit (MCU). The touch sensor controller 114 controls a gain adjuster 116 (see FIG. 6) based on the previously set parameter and adjusts a gain of the variable gain amplifier PREAMP in the touch input sensing portion TT1 and the noise measurement portion TT2. The touch sensor controller 114 adjusts the number of integrations of the digital integrator 115 based on the previously set parameter in the touch input sensing portion TT1 and the noise measurement portion TT2.

Figure 5:
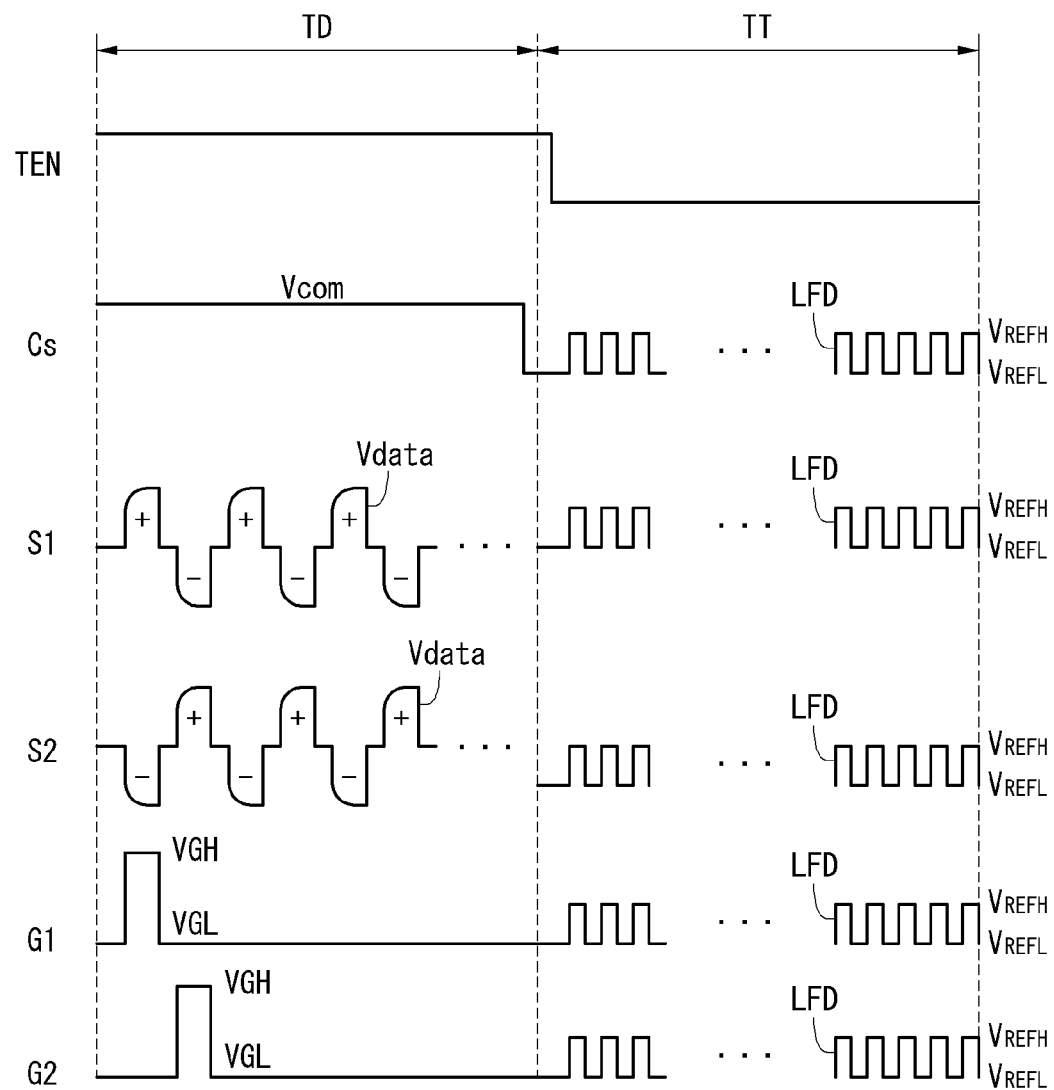
FIG. 5 is a waveform diagram illustrating signals applied to signal lines of a pixel array during a display period and a touch sensor driving period, according to an embodiment.

FIGS. 4A to 4C illustrate a display period and a touch sensor driving period. FIG. 5 is a waveform diagram illustrating signals applied to signal lines of a pixel array during a display period and a touch sensor driving period. In FIGS. 5, S1 and S2 are the data lines 101, and G1 and G2 are the gate lines 103.

Referring to FIGS. 4A to 4C and FIG. 5, the display driving circuit (102, 104, and 106) writes data of an input image to the pixels of the display panel 100 during the display period TD for image display. The touch sensor driver 110 does not sense a touch input in response to the touch sync signal TSYNC during the display period TD. The display driving circuit (102, 104, and 106) holds a data voltage Vdata charged to the pixels during the touch sensor driving period TT.

The data driver 102 may supply AC signal (hereinafter referred to as a load free drive (LFD) signal) having the same phase as the touch sensor driving signal $V_{MOD}$ to the data lines 101 under the control of the timing controller 106 during the touch sensor driving period TT. The voltage of the LFD signal may be set to a voltage equal to the voltage of the touch sensor driving signal $V_{MOD}$. A voltage difference between the sensor line 111 and the data line 101, that are now being driven, can be reduced due to the LFD signal, and thus a parasitic capacitance between them can be reduced. In other embodiments, the data driver 102 may block a current path between output channels of the data driver 102 and the data lines 101 under the control of the timing controller 106 during the touch sensor driving period TT, thereby maintaining the output channels in a high impedance state.

The gate driver 104 may supply the AC signal (i.e., the LFD signal) having the same phase as the touch sensor driving signal $V_{MOD}$ to the gate lines 103 under the control of the timing controller 106 during the touch sensor driving period TT. The voltage of the LFD signal may be set to be equal or similar to the voltage of the touch sensor driving signal $V_{MOD}$. A voltage difference between the sensor line 111 and the gate line 103, that are now being driven, can be reduced due to the LFD signal, and thus a parasitic capacitance between them can be reduced.

The LFD signal applied to the gate line 103 may be set to a voltage level lower than that of the touch sensor driving signal $V_{MOD}$ to maintain an off-state in the TFTs of the pixel during the touch sensor driving period TT. For example, when the touch sensor driving signal $V_{MOD}$ is a pulse signal having a voltage of 2 V to 8 V, the LFD signal applied to the gate line 103 may be a pulse signal having a voltage of −10 V to −4 V. In this case, the LFD signal applied to the gate line 103 has a lower voltage level than the touch sensor driving signal $V_{MOD}$, but has the same phase as the touch sensor driving signal $V_{MOD}$ and the same voltage swing width as the touch sensor driving signal $V_{MOD}$.

In other embodiments, the gate driver 104 may block a current path between output channels of the gate driver 104 and the gate lines 103 under the control of the timing controller 106 during the touch sensor driving period TT, thereby maintaining the output channels in a high impedance state.

The touch sensor driving signal $V_{MOD}$ may be applied to the sensor lines 111 of the MUX channel connected to the sensing unit 113 through the multiplexer 112, and the LFD signal may be applied to the sensor lines 111 that are not connected to the sensing unit 113. A parasitic capacitance between the adjacent sensor lines 111, that are being driven, can be reduced due to the LFD signal.

The touch sensor driving signal $V_{MOD}$ may swing between a high voltage $V_{REFH}$ and a low voltage $V_{REFL}$. The touch sensor driving signal $V_{MOD}$ may be properly set depending on the design specification of the display panel 100. The touch sensor driving signal $V_{MOD}$ may be generated at a proper voltage level in consideration of voltages for driving the display panel 100, such as VCC, VDD, a common voltage, a data driving voltage, and a gate voltage.

The touch sensor driver 110 supplies the common voltage Vcom of the pixels to the electrodes of the touch sensors Cs through the sensor lines 111 during the display period TD. The touch sensor driver 110 senses a touch input during the touch input sensing portion TT1 of the touch sensor driving period TT. The multiplexer 112 selects the touch sensors Cs (for each MUX channel) to be connected to the sensing unit 113 under the control of the touch sensor controller 114. The sensing unit 113 is sequentially connected to the touch sensors Cs through the multiplexer 112 and senses an amount of charge changed in each touch sensor Cs before and after a touch input. In FIG. 3 and FIGS. 4A to 4C, numbers 1 to 10 denote the touch sensors Cs respectively connected to the MUX channels of the multiplexer 112. For example, when the multiplexer 112 is a 10-to-1 multiplexer, each multiplexer 112, during the touch input sensing portion TT1, connects touch sensors 1 of a first group to the sensing unit 113 through a first MUX channel CH1 and a first sensor line 111, and connects touch sensors 2 of a second group to the sensing unit 113 through a second MUX channel CH2 and a second sensor line 111. During the touch input sensing portion TT1, each multiplexer 112 sequentially connects third to tenth MUX channels CH3 to CH10 subsequent to the second MUX channel CH2 to the sensing unit 113 and connects touch sensors 3 to 10 of third to tenth groups to the sensing unit 113.

The touch sensor driver 110 measures noise introduced into the touch sensors Cs from the outside and varies a touch sensor driving frequency depending on a level of the noise during the noise measurement portion TT2. Each multiplexer 112 simultaneously connects the touch sensors 1 to 10 of the plurality of groups to the sensing unit 113 through the two or more MUX channels CH1 to CH10 and the plurality of sensor lines 111 during the noise measurement portion TT2.

The touch sensor driver 110 may supply the LFD signal to the sensor lines 111 through the MUX channel other than the MUX channel to sense the touch input. The LFD signal can reduce a parasitic capacitance between the sensor lines 111.

The touch sensor driver 110 generates coordinates of a touch input at a predetermined touch report rate. The touch sensor driver 110 may output a noise measurement value of the touch sensor at a report rate of the same frequency as the touch report rate. However, embodiments are not limited thereto.

As described above, the LFD signal may be applied to the data lines 101, the gate lines 103, and the sensor lines 111, in order to reduce a parasitic capacitance of the display panel 100 during the touch sensor driving period TT. The LFD signal may be generated as a signal having the same phase and the same voltage as the touch sensor driving signal $V_{MOD}$, but is not limited thereto. For example, any type of LFD signal similar to the touch sensor driving signal $V_{MOD}$ may be used as long as an effect of reducing the parasitic capacitance of the display panel 100 during the touch sensor driving period TT is obtained. When the LFD signal is applied to the lines 101, 103 and 111 of the display pane 100, a delay amount of signal may vary depending on a position of the display pane 100 due to a load and RC delay of the display pane 100. Hence, a delay, an amplitude (voltage magnitude), etc. of the AC signal measured in the display pane 100 may vary. A waveform and the voltage of the LFD signal may be adjusted depending on the position of the display panel 100 in consideration of the load or the RC delay of the display pane 100.

The noise measurement portion TT2 may be disposed after the touch input sensing portion TT1 in the touch sensor driving period TT as shown in FIG. 4A, or may be disposed before the touch input sensing portion TT1 in the touch sensor driving period TT as shown in FIG. 4B. Alternatively, as shown in FIG. 4C, the noise measurement portion TT2 may be divided into two parts and disposed both before and after the touch input sensing portion TT1 in the touch sensor driving period TT. The noise measurement portion TT2 may be sub-divided into a plurality of portions A to D.

The same touch sensor driving frequency may be set in the portions A, B, C and D. In some embodiments, different touch sensor driving frequencies may be set in the portions A, B, C and D. The touch sensor driver 110 measures noise of the touch sensors in the noise measurement portion TT2 and changes the touch sensor driving frequency to a frequency of a relatively minimum noise among noises measured at different frequencies. Namely, the touch sensor driver 110 may change the touch sensor driving frequency in the noise measurement portion TT2.

Figure 7:
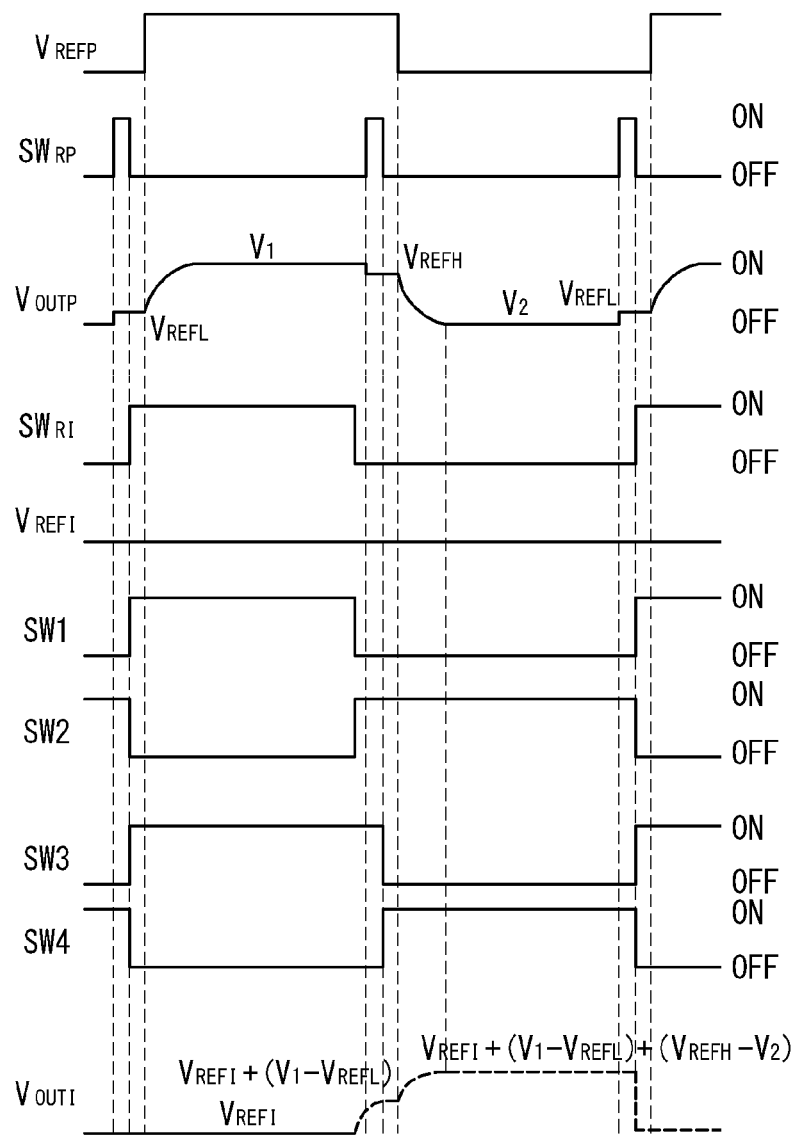
FIG. 7 is a waveform diagram illustrating an operation of an integrator shown in FIG. 6, according to an embodiment.
Figure 8:
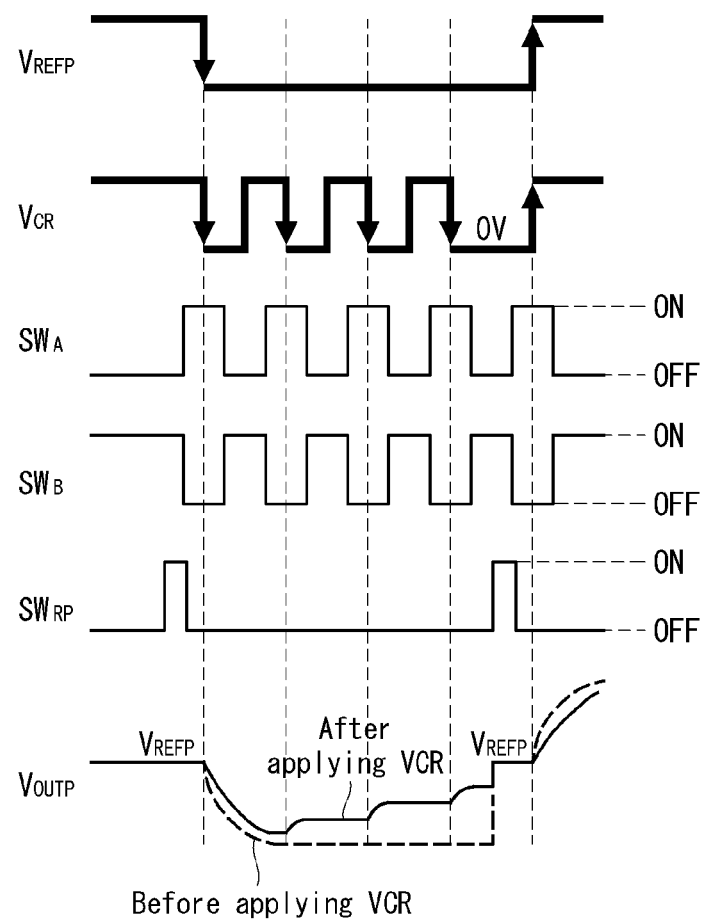
FIG. 8 is a waveform diagram illustrating an operation of a charge removal unit shown in FIG. 6, according to an embodiment.

FIGS. 6 to 8 illustrate an operation of the touch sensor driver 110 in the touch input sensing portion TT1.

FIG. 6 is a circuit diagram illustrating a circuit configuration of a sensing unit and an operation of a touch input sensing portion. An example of FIG. 6 illustrates an operation of sensing, by the sensing unit 113, a touch input through the touch sensors Cs connected to a first MUX channel CH1. In this embodiment, the LFD signal having the same phase as the touch sensor driving signal $V_{MOD}$ is supplied to the sensor lines 111 connected to the MUX channels CH2 to CH10 other than the first MUX channel CH1. When the sensing unit 113 senses the touch input, the multiplexer 112 sequentially connects the MUX channels to the sensing unit 113. FIG. 7 is a waveform diagram illustrating an operation of an integrator shown in FIG. 6. FIG. 8 is a waveform diagram illustrating an operation of a charge removal unit shown in FIG. 6. The circuit configuration of the sensing unit 113 is not limited to FIG. 6. In FIG. 6, "TSP" is a touch screen including the touch sensors Cs, and "Touch IC" indicates an integrated circuit (IC) in which the touch sensor driver 110 is located.

An analog circuit of the touch sensor driver 110 includes the variable gain amplifier PREAMP and the analog integrator INT. The ADC 117 is connected to an output terminal of the analog integrator INT.

The variable gain amplifier PREAMP amplifies a signal on the sensor lines 111 connected to the touch sensors Cs. The variable gain amplifier PREAMP may amplify an amount of charge in a rising portion of the touch sensor driving signal $V_{MOD}$. The touch sensor controller 114 supplies the touch sensor driving signal $V_{MOD}$ to an inverting input terminal (−) of the variable gain amplifier PREAMP in the touch input sensing portion TT1 and supplies a predetermined DC reference voltage $V_{REFL}$ to the inverting input terminal (−) of the variable gain amplifier PREAMP in the noise measurement portion TT2.

A gain of the variable gain amplifier PREAMP may be adjusted by the gain adjuster 116. The gain adjuster 116 supplies digital gain data to the variable gain amplifier PREAMP and adjusts the gain of the variable gain amplifier PREAMP. The gain of the variable gain amplifier PREAMP during the touch input sensing portion TT1 is adjusted to be greater than the gain of the variable gain amplifier PREAMP during the noise measurement portion TT2 under the control of the touch sensor controller 114. Because the number of MUX channels simultaneously connected to the sensing unit 113 in the touch input sensing portion TT1 is less than the number of MUX channels simultaneously connected to the sensing unit 113 in the noise measurement portion TT2, an amount of charge received through the MUX channels in the touch input sensing portion TT1 decreases. Thus, the variable gain amplifier PREAMP amplifies the touch sensor signal received during the touch input sensing portion TT1 with the gain greater than the gain of the noise measurement portion TT2.

A charge removal unit ACR may be connected to an input terminal of the variable gain amplifier PREAMP. The charge removal unit ACR reduces the amplitude of a change of touch sensor signals. In some embodiment, the charge removal unit ACR may be omitted.

In the case of a self-capacitance touch sensor Cs, the touch sensor driving signal $V_{MOD}$ is applied to a reference voltage terminal (i.e., a non-inverting input terminal (+)) of the variable gain amplifier PREAMP as shown in FIG. 6. In the case of a mutual capacitance touch sensor Cm shown in FIGS. 23 to 26, the touch sensor driving signal $V_{MOD}$ is directly applied to the Tx line.

The variable gain amplifier PREAMP includes a first amplifier OPP, a feedback capacitor $C_{FBP}$, and a reset switch $SW_{RP}$. The first amplifier OPP may be a single-ended amplifier as shown in FIG. 6.

The feedback capacitor $C_{FBP}$ and the reset switch $SW_{RP}$ are connected in parallel between an inverting input terminal (−) and an output terminal of the first amplifier OPP. The touch sensor driving signal $V_{MOD}$ as a reference voltage $V_{REFP}$ is supplied to a non-inverting input terminal (+) of the first amplifier OPP. A gain control terminal of the first amplifier OPP is connected to an output terminal of the gain adjuster 116.

The touch sensor driving signal $V_{MOD}$ swings between the high voltage $V_{REFH}$ and the low voltage $V_{REFL}$. Because charges are supplied to the touch sensor Cs due to the touch sensor driving signal $V_{MOD}$, an amount of charge of the touch sensor Cs before and after a touch input may be different. When the charge removal unit ACR does not operate, an output voltage $V_{OUTP}$ of the variable gain amplifier PREAMP is expressed by the following Equation 1.

$$V_{OUTP} = V_{MOD} \times \left(1 + \frac{C_{FIN}}{C_{FBP}}\right), V_{MOD} = V_{REFH} - V_{REFL} \quad \text{[Equation 1]}$$

where "CFIN" is a capacitance between a finger or a conductor and the touch sensor.

The analog integrator INT amplifies a difference between the output voltage $V_{OUTP}$ of the variable gain amplifier PREAMP and a reference voltage $V_{REFI}$ of the analog integrator INT at a ratio of "α=Cs/$C_{FBI}$" corresponding to its gain, where Cs is a capacitance of a sampling capacitor, and $C_{FBI}$ is a capacitance of a feedback capacitor of the analog integrator INT. The analog integrator INT accumulates a voltage, sampled by the number of driving signals applied, to a capacitor $C_{FBI}$ and integrates the accumulated voltage.

The number of integrations of the analog integrator INT in the touch input sensing portion TT1 is controlled to be more than the number of integrations of the analog integrator INT in the noise measurement portion TT2. The frequency of the touch sensor driving signal $V_{MOD}$ may be adjusted by the touch sensor controller 114.

The analog integrator INT of FIG. 6 accumulates the output voltage $V_{OUTP}$ of the variable gain amplifier PREAMP through delta integration (DI) and double sampling (DS). DI is a scheme for integrating only a difference between touch data and non-touch data. In the DS scheme, the output voltage $V_{OUTP}$ of the variable gain amplifier PREAMP is sampled in a rising portion and a falling portion of a driving signal applied to the touch sensor. The analog integrator INT according to one embodiment may implement the DS using a single-ended amplifier so that a circuit area is not increased due to the DS.

The analog integrator INT includes a first sampling circuit SCC1, a second sampling circuit SCC2, an integrating capacitor $C_{FBI}$, and a second amplifier OPI.

The first and second sampling circuits SCC1 and SCC2 are connected to an inverting input terminal (−) of the second amplifier OPI. The reset switch $SW_{R1}$ and the feedback capacitor $C_{FBP}$ are connected between the inverting input terminal (−) and an output terminal of the second amplifier OPI. The reference voltage $V_{REFI}$ is supplied to a non-inverting input terminal (+) of the second amplifier OPI.

The reference voltages $V_{REFIH}$ and $V_{REFIL}$ of the first and second sampling circuits SCC1 and SCC2 are set to the same voltage as the output voltage $V_{OUTP}$ of the variable gain amplifier PREAMP in a non-touch input state. The reference voltage $V_{REFI}$ of the first and second sampling circuits SCC1 and SCC2 is the same as the reference voltage $V_{REFI}$ of the second amplifier OPI. Thus, the analog integrator INT integrates only a difference between a voltage when a touch input is performed and a voltage in a non-touch state. As a result, the number of integrations of the analog integrator INT can be increased without an increase in a capacitance of the integrating capacitor $C_{FBI}$.

The first sampling circuit SCC1 samples the output voltage $V_{OUTP}$ in the rising portion of the touch sensor driving signal $V_{MOD}$. The first sampling circuit SCC1 includes a $(1a)^{th}$ switch $SW_{11}$, a $(1b)^{th}$ switch $SW_{12}$, a $(2a)^{th}$ switch $SW_{21}$, a $(2b)^{th}$ switch $SW_{22}$, and a first sampling capacitor $C_{S1}$. The $(1a)^{th}$ and $(1b)^{th}$ switches $SW_{11}$ and $SW_{12}$ are turned on and off in response to a first switch control signal SW1 shown in FIG. 7. The $(2a)^{th}$ and the $(2b)$th switches $SW_{21}$ and $SW_{22}$ are turned on and off in response to a second switch control signal SW2. The switch control signals $SW_{RP}$, $SW_{R1}$, SW1, SW2, SW3, and SW4 shown in FIG. 7 may be generated by the touch sensor controller 114.

The $(1a)^{th}$ and $(1b)^{th}$ switches $SW_{11}$ and $SW_{12}$ are simultaneously turned on prior to the rising portion of the touch sensor driving signal $V_{MOD}$. Hence, the output voltage $V_{OUTP}$ is supplied to the first sampling capacitor $C_{S1}$, and an amount of charge of the touch sensor Cs in the rising portion of the touch sensor driving signal $V_{MOD}$ is sampled. The $(2a)^{th}$ and the $(2b)$th switches $SW_{21}$ and $SW_{22}$ are turned on after the $(1a)^{th}$ and the $(1b)^{th}$ switches $SW_{11}$ and $SW_{12}$ are turned off in the rising portion of the touch sensor driving signal $V_{MOD}$. The $(2a)^{th}$ and $(2b)^{th}$ switches $SW_{21}$ and $SW_{22}$ supply the output voltage $V_{OUTP}$ to the feedback capacitor $C_{FB1}$ of the second amplifier OPI in the rising portion of the touch sensor driving signal $V_{MOD}$.

A voltage sampled in the rising portion of the touch sensor driving signal $V_{MOD}$ is $V_{OUTP}-V_{REFIH}$. When the output voltage $V_{OUTP}$ is an output voltage V1 of the variable gain amplifier PREAMP in a non-touch state and the reference voltage $V_{REFIH}$ is set to the output voltage V1, $V_{OUTP}-V_{REFIH}=V1-V1=0$. When a touch input is generated, the output voltage $V_{OUTP}$ becomes greater than the reference voltage $V_{REFIH}$.

The second sampling circuit SCC2 samples the output voltage $V_{OUTP}$ in the falling portion of the touch sensor driving signal $V_{MOD}$. The second sampling circuit SCC2 includes a $(3a)^{th}$ switch SW31, a $(3b)^{th}$ switch SW32, a $(4a)^{th}$ switch SW41, a $(4b)^{th}$ switch SW42, and a second sampling capacitor CS2. The $(3a)^{th}$ and $(3b)^{th}$ switches $SW_{31}$ and $SW_{32}$ are turned on and off in response to a third switch control signal SW3 shown in FIG. 7. The $(4a)^{th}$ and $(4b)^{th}$ switches $SW_{41}$ and $SW_{42}$ are turned on and off in response to a fourth switch control signal SW4. The $(3a)^{th}$ and $(3b)^{th}$ switches $SW_{31}$ and $SW_{32}$ are turned on prior to the rising portion of the touch sensor driving signal $V_{MOD}$ and reset the voltage of the second sampling capacitor $C_{S2}$ to $V_{REFIL}-V_{REFI}$. The $(4a)^{th}$ and $(4b)^{th}$ switches $SW_{41}$ and $SW_{42}$ are turned on prior to the falling portion of the touch sensor driving signal $V_{MOD}$ and supply the output voltage $V_{OUTP}$ to the feedback capacitor $C_{FB1}$ through the second sampling capacitor $C_{S2}$. A voltage sampled in the falling portion of the touch sensor driving signal $V_{MOD}$ is $V_{REFIL}-V_{OUTP}$. When the output voltage $V_{OUTP}$ is the output voltage V2 of the variable gain amplifier PREAMP in a non-touch state and the reference voltage $V_{REFI2}$ is set to the output voltage V2, $VREFI2-V_{OUTP}=V2-V2=0$. When a touch input is generated in the falling portion of the touch sensor driving signal $V_{MOD}$, the output voltage $V_{OUTP}$ becomes less than the reference voltage $V_{REFIL}$ because the output voltage $V_{OUTP}$ is a negative voltage.

In accordance with an embodiment, the analog integrator INT may be implemented as shown in FIG. 6 so that the analog integrator INT is able to integrate only a difference between a touch voltage and a non-touch voltage. Furthermore, the second amplifier OPI may be configured to perform double sampling so that the first sampling circuit SCC1 and the second sampling circuit SCC2 alternately sample an input voltage. The analog integrator INT according to an embodiment is not limited to a circuit shown in FIG. 6. For example, the analog integrator INT according to an embodiment may be implemented using a simpler circuit for accumulating an input voltage only in the rising portion and the falling portion of the touch sensor driving signal $V_{MOD}$.

When a capacitance value of the touch sensor is large as in a large-screen display panel, the output voltage $V_{OUTP}$ of the variable gain amplifier PREAMP is increased. Thus, the output voltage $V_{OUTP}$ may exceed a permissible range defined in the specifications of the touch IC and may be saturated. In this instance, it is not easy to determine a touch input because the output voltage $V_{OUTP}$ is the same or almost equal in the touch input and the non-touch state. The charge removal unit ACR may be used to control an amount of charge of the touch sensor.

The charge removal unit ACR includes one or more capacitors $C_C$ and $C_F$ and first and second switches $SW_A$ and $SW_B$.

Electrodes of the capacitors $C_C$ and $C_F$ on one side of the capacitors are connected to an inverting input terminal (−) of the first amplifier OPP through the first switch $SW_A$. Furthermore, the electrodes of the capacitors $C_C$ and $C_F$ on one side of the capacitors are connected to a non-inverting input terminal (+) of the first amplifier OPP through the second switch $SW_B$. Charge removing pulse signals $V_{CR\_C}$ and $V_{CR\_F}$ for removing charges are supplied to electrodes of the capacitors $C_C$ and $C_F$ on the other side of the capacitors during the touch input sensing portion TT1. In FIG. 8, VCR denotes pulse signals $V_{CR\_C}$ and $V_{CR\_F}$ for removing charges in FIG. 6.

The first and second switches $SW_A$ and $SW_B$ are alternately turned on under the control of the touch sensor controller 114 as shown in FIG. 8 and are switched in opposite manners. In other words, when one of the first and second switches $SW_A$ and $SW_B$ is turned on in response to switch control signals having opposite phases, the other of the first and second switches $SW_A$ and $SW_B$ is turned off.

The second switch $SW_B$ is turned off at substantially same time as the first switch $SW_A$ is turned on at a timing prior to falling edges of the pulse signals $V_{CR\_C}$ and $V_{CR\_F}$ for removing charges. In an on-state of the first switch $SW_A$, the pulse signals $V_{CR\_C}$ and $V_{CR\_F}$ for removing charges have falling edges. As the number of falling edges is increased, the cumulative number of adjusted values of the output voltage $V_{OUTP}$ is increased.

When the charge removal unit ACR operates, the output voltage $V_{OUTP}$ of the variable gain amplifier PREAMP is expressed by the following Equation 2. As can be seen from the following Equation 2, the charge removal unit ACR can reduce the output voltages of the amplifier PREAMP and the analog integrator INT within a range in which a range of an input voltage input to the ADC is satisfied without increasing the size of the touch IC in consideration of a permissible range defined in the specifications of the touch IC.

$$V_{OUTP} = V_{REFH} \times V_{MOD} \times \left(1 + \frac{C_S + C_{CR}}{C_{FBP}}\right) - n \times V_{CR} \times \frac{C_{CR}}{C_{FBP}} \quad \text{[Equation 2]}$$

Where $V_{MOD}=V_{REFH}-V_{REFL}$, "$C_{CR}$" is a capacitance of the capacitors $C_C$ and $C_F$, "Cs" is a capacitance of the touch sensor Cs, and "n" is the number of pulse signals $V_{CR\_C}$ and $V_{CR\_F}$ for removing charges.

An output voltage of the analog integrator INT is input to the ADC 117 and is converted into digital data. Touch data output from the ADC 117 is input to the touch sensor controller 114 through the digital integrator 115. The digital integrator 115 adds the predetermined number of digital integrations to the touch data output from the ADC 117 and increases digital values of the touch data. The number of digital integrations in the touch input sensing portion TT1 may be controlled to be less than the number of digital integrations in the noise measurement portion TT2 using the touch sensor controller 114. The number of analog integrations and the number of digital integrations can be properly distributed in consideration of a size of the display panel 100, magnitudes of the power voltages, driving conditions of the display panel 100, and the like.

Figure 9:
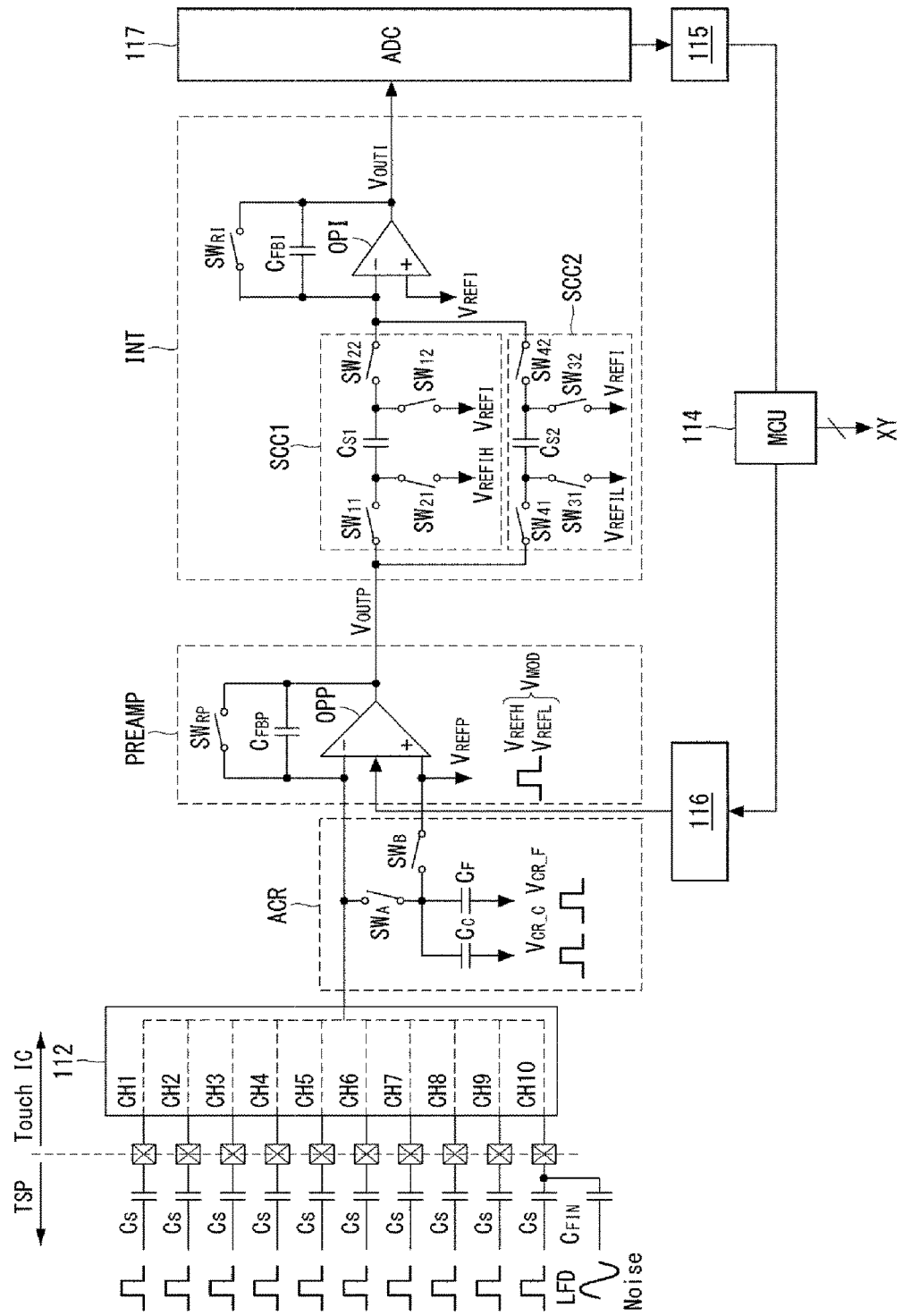
FIG. 9 illustrates an operation of a touch sensor driver according to a first embodiment in a noise measurement portion.

FIG. 9 illustrates an operation of the touch sensor driver 110 according to a first embodiment in the noise measurement portion TT2.

Referring to FIG. 9, an embodiment simultaneously connects two or more MUX channels to the sensing unit 113 in the noise measurement portion TT2, in order to measure noise of all the touch sensors Cs during the noise measurement portion TT2. FIG. 9 illustrates an example where all of MUX channels CH1 to CH10 of the multiplexer 112 are simultaneously connected to the sensing unit 113. However, embodiments are not limited thereto.

The sensing unit 113 generates a touch sensor driving signal $V_{MOD}$ during the noise measurement portion TT2 in the same manner as the touch input sensing portion TT1. The touch sensor driving signal $V_{MOD}$ in the noise measurement portion TT2 is generated at various frequencies including a frequency of the touch input sensing portion TT1, in order to measure noise at respective frequencies.

During the noise measurement portion TT2, the sensing unit 113 simultaneously connects the two or more channels CH1 to CH10 to one variable gain amplifier PREAMP and simultaneously measures noise introduced from an external environment through the touch sensors Cs connected to the two or more sensor lines 111. The multiplexer 112 short-circuits the two or more channels CH1 to CH10 and connects the two or more channels CH1 to CH10 to the inverting input terminal (−) of the variable gain amplifier PREAMP.

During the noise measurement portion TT2, the touch sensor driving signal $V_{MOD}$ is input to the non-inverting input terminal (+) of the variable gain amplifier PREAMP. Thus, during the noise measurement portion TT2, charges are supplied to the sensor lines 111 due to the touch sensor driving signal $V_{MOD}$.

Because a large number of MUX channels are simultaneously connected to the sensing unit 113 during the noise measurement portion TT2, a large amount of charge is received at the variable gain integrator PREAMP through the large number of MUX channels. One embodiment reduces the gain of the variable gain amplifier PREAMP so that the output voltage of the variable gain amplifier PREAMP is not saturated due to the large amount of charge received during the noise measurement portion TT2. The gain of the variable gain amplifier PREAMP is controlled to a smaller value in the noise measurement portion TT2 than in the touch input sensing portion TT1 by the gain adjuser 116.

The analog integrator INT accumulates the voltage amplified by the variable gain amplifier PREAMP during the noise measurement portion TT2 and transmits the accumulated voltage to the ADC 117. The number of integrations of the analog integrator INT in the noise measurement portion TT2 can be controlled to be less than the number of integrations of the analog integrator INT in the touch input sensing portion TT1. In order to increase the sensitivity of noise measurement, the number of digital integrations can be increased by a reduction in the number of analog integrations. For example, during the touch input sensing portion TT1, the number of analog integrations and the number of digital integrations may be set to five, respectively. On the other hand, during the noise measurement portion TT2, the number of analog integrations may be reduced to three, and the number of digital integrations may be increased to seven. In some embodiments, the number of analog integrations and the number of digital integrations are not limited to a specific number. As described above, the number of analog integrations and the number of digital integrations can be adjusted in consideration of the size of the display panel 100, magnitudes of the power voltages, driving conditions of the display panel 100, and the like.

The sensing unit 113 converts an analog voltage output by the analog integrator INT into digital data through the ADC 117 during the noise measurement portion TT2. During the noise measurement portion TT2, the touch sensor controller 114 receives the digital data as a current noise, compares the current noise with a previous noise stored in a memory, and changes a touch sensor driving frequency when the current noise is greater than the previous noise. When the current noise is less than the previous noise, the touch sensor controller 114 maintains a current touch sensor driving frequency.

Figure 10:
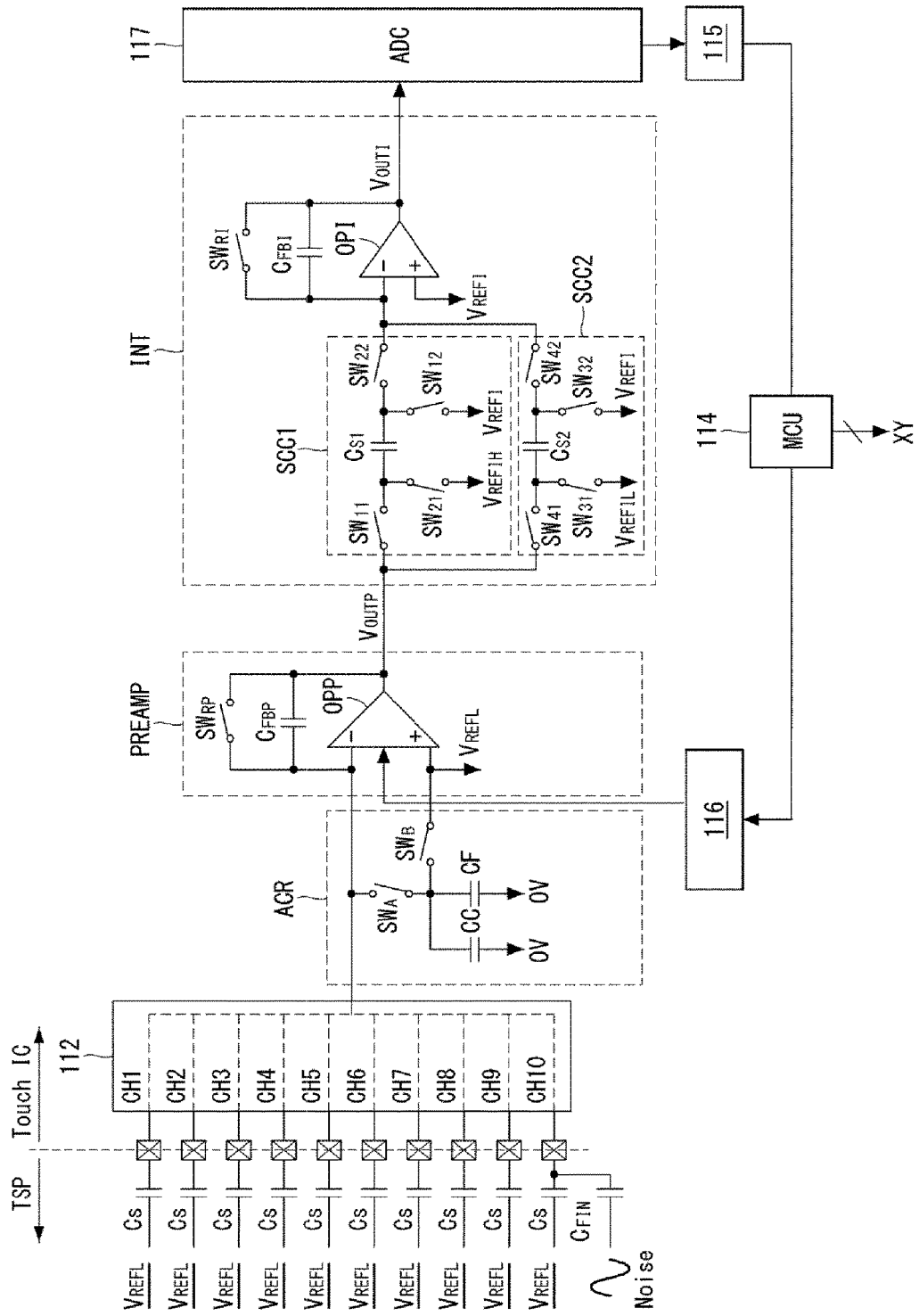
FIG. 10 illustrates an operation of a touch sensor driver according to a second embodiment in a noise measurement portion.

FIG. 10 illustrates an operation of the touch sensor driver 110 according to a second embodiment in the noise measurement portion TT2.

Referring to FIG. 10, the second embodiment is configured such that the touch sensor driving signal $V_{MOD}$ is not generated in order to measure noise using only an amount of charge coming through a finger or a conductor during the noise measurement portion TT2 while excluding charge of the touch sensor.

The sensing unit 113 is driven at various frequencies including a frequency equal to a frequency of the touch input sensing portion TT1, in order to measure noise at respective frequencies during the noise measurement portion TT2. In some embodiments, the frequency is an operating frequency of the sensing units 113. The operating frequency of the sensing units 113 is a frequency of the variable gain amplifier PREAMP and the analog integrator INT, namely, a frequency of the switching elements $SW_{RP}$, $SW_{RI}$, and SW1 to SW4.

During the noise measurement portion TT2, the sensing unit 113 simultaneously connects the two or more channels CH1 to CH10 to one variable gain amplifier PREAMP and simultaneously measures noise introduced from an external environment through the touch sensors Cs connected to the two or more sensor lines 111. The multiplexer 112 short-circuits the two or more channels CH1 to CH10 and connects the two or more channels CH1 to CH10 to the inverting input terminal (−) of the variable gain amplifier PREAMP. Thus, during the noise measurement portion TT2, only charges received to the touch sensors through a finger or a conductor are input to the variable gain amplifier PREAMP.

The sensing unit 113 inputs a low voltage $V_{REFL}$ to the non-inverting input terminal (+) of the variable gain amplifier PREAMP, in order to amplify only an amount of charge coming through a finger or a conductor during the noise measurement portion TT2. The low voltage $V_{REFL}$ may be set to a DC voltage which is higher than 0 V and lower than a power voltage VDD. The power voltage VDD may be between 3.3 V and 12 V.

In accordance with the embodiment, reference voltages input to the capacitors $C_C$ and $C_F$ of the charge removal unit ACR during the noise measurement portion TT2 are fixed to 0 V, and noise received through the touch sensors is measured. The analog integrator INT operates in the touch input sensing portion TT1 and the noise measurement portion TT2, accumulates a noise voltage amplified by the variable gain amplifier PREAMP, and sends the accumulated noise voltage to the ADC 117.

The sensing unit 113 converts an analog voltage output by the analog integrator INT into digital data through the ADC 117 during the noise measurement portion TT2. During the noise measurement portion TT2, the touch sensor controller 114 receives the digital data as a current noise, compares the current noise with a previous noise stored in a memory, and changes a driving frequency of the sensing unit 113 when the current noise is greater than the previous noise. When the current noise is less than the previous noise, the touch sensor controller 114 maintains a current touch sensor driving frequency of the sensing unit 113.

When the charge removal unit ACR does not operate, the output voltage $V_{OUTP}$ of the variable gain amplifier PRE-AMP is expressed by the following Equation 3.

$$V_{OUTP} = \Delta V_{noise} \times \left(\frac{C_{FIN}}{C_{FBP}}\right) + V_{REFL} \qquad \text{[Equation 3]}$$

where "$C_{FIN}$" is a capacitance between a finger or a conductor and the touch sensor, and "$\Delta V_{noise}$" is an input voltage of the variable gain amplifier PREAMP which is generated due to charges coming through a finger or a conductor.

FIGS. 11A to 11G illustrate various examples of a channel short-circuit of a sensing unit during a noise measurement portion. As shown in FIGS. 11A to 11G, the multiplexer 112 can simultaneously connect a plurality of MUX channels CH1 to CH10 to the sensing unit 113 using various methods under the control of the touch sensor controller 114.

Figure 12:
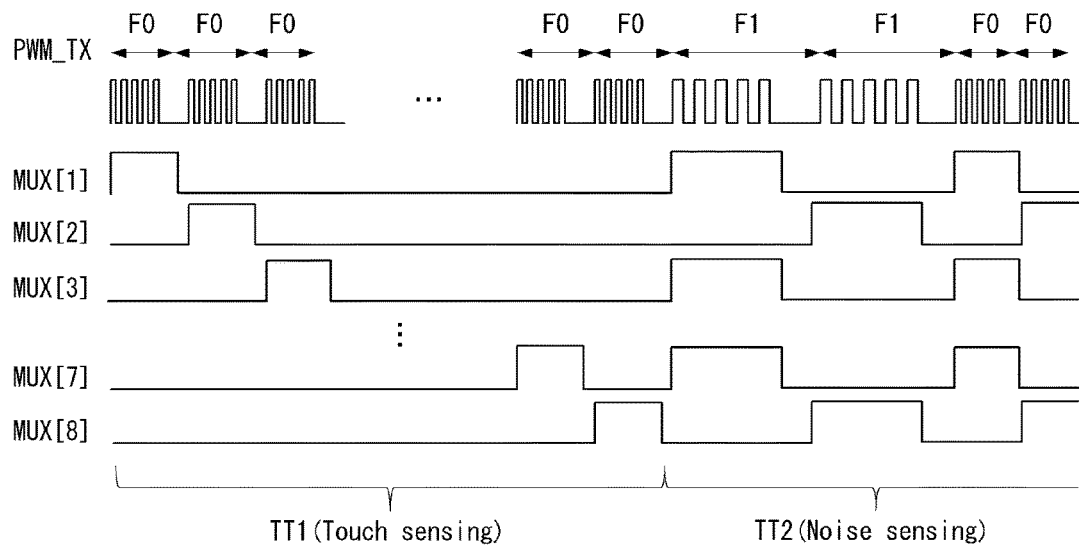
FIGS. 12 and 13 are waveform diagrams illustrating a method for controlling a multiplexer in a touch input sensing portion and a noise measurement portion, according to an embodiment.
Figure 13:
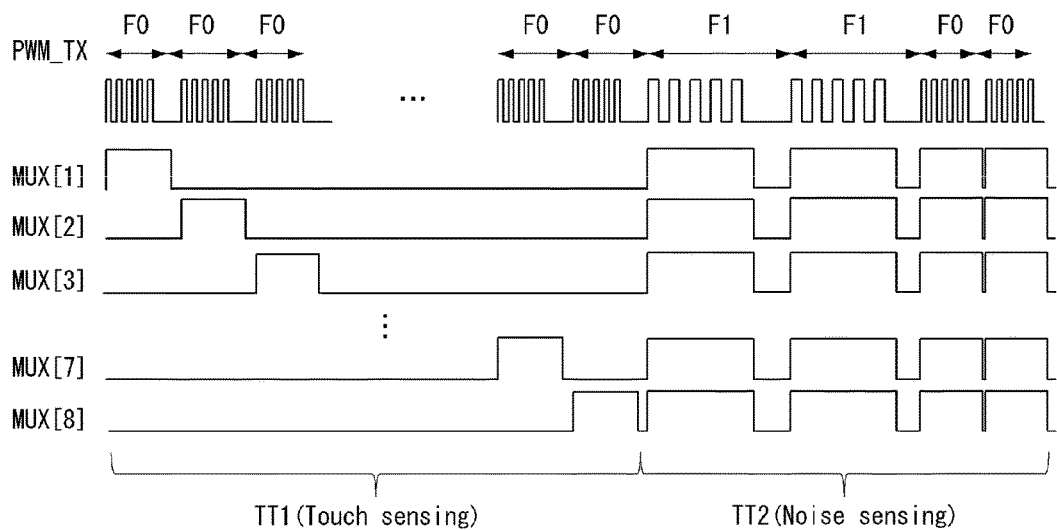

FIGS. 12 and 13 are waveform diagrams illustrating a method for controlling a multiplexer in a touch input sensing portion and a noise measurement portion.

In FIGS. 12 and 13, "PWM_TX" is the touch sensor driving signal $V_{MOD}$ in the embodiment of FIG. 9, and "F0" and "F1" are frequencies of the the touch sensor driving signal $V_{MOD}$. In the embodiment of FIG. 10, the touch sensor driving signal $V_{MOD}$ is not applied to the sensor lines 111. In the embodiment of FIG. 10, "F0" and "F1" of FIGS. 12 and 13 is the operating frequency of the sensing units 113, namely, the frequency of the switching elements $SW_{RP}$, $SW_{RP}$, and SW1 to SW4.

Figure 11A:
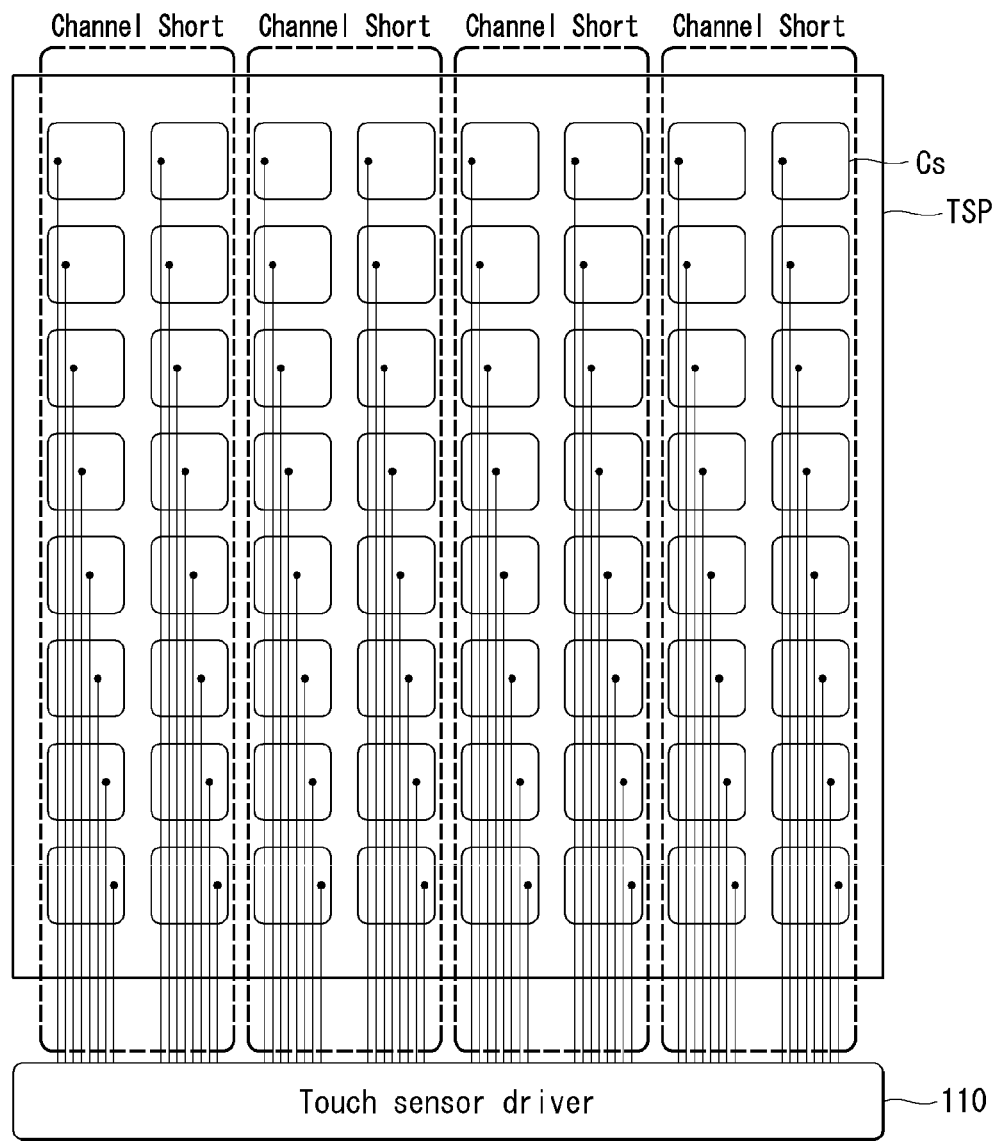
FIGS. 11A to 11G illustrate various examples of a channel short-circuit of a sensing unit during a noise measurement portion, according to an embodiment.
Figure 11B:
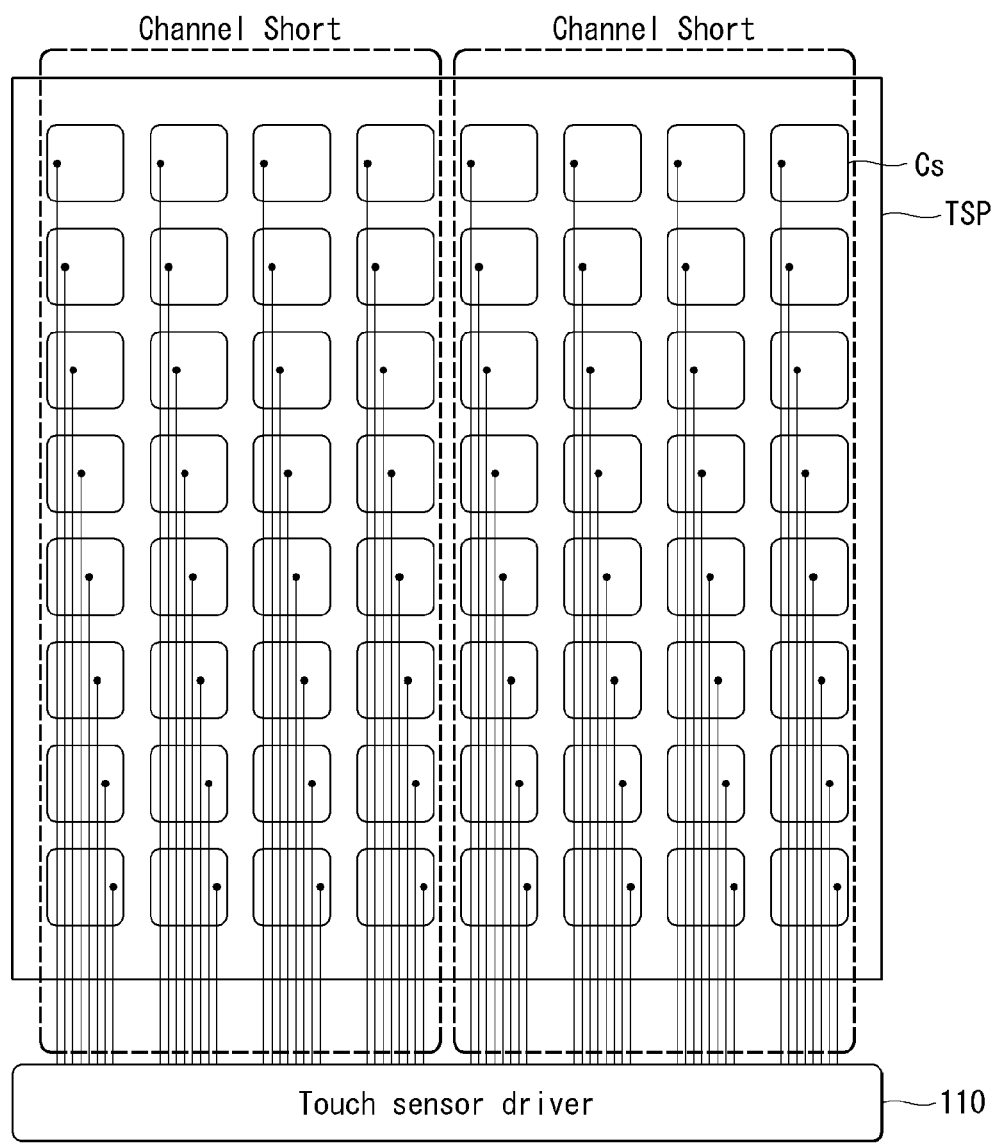
Figure 11C:
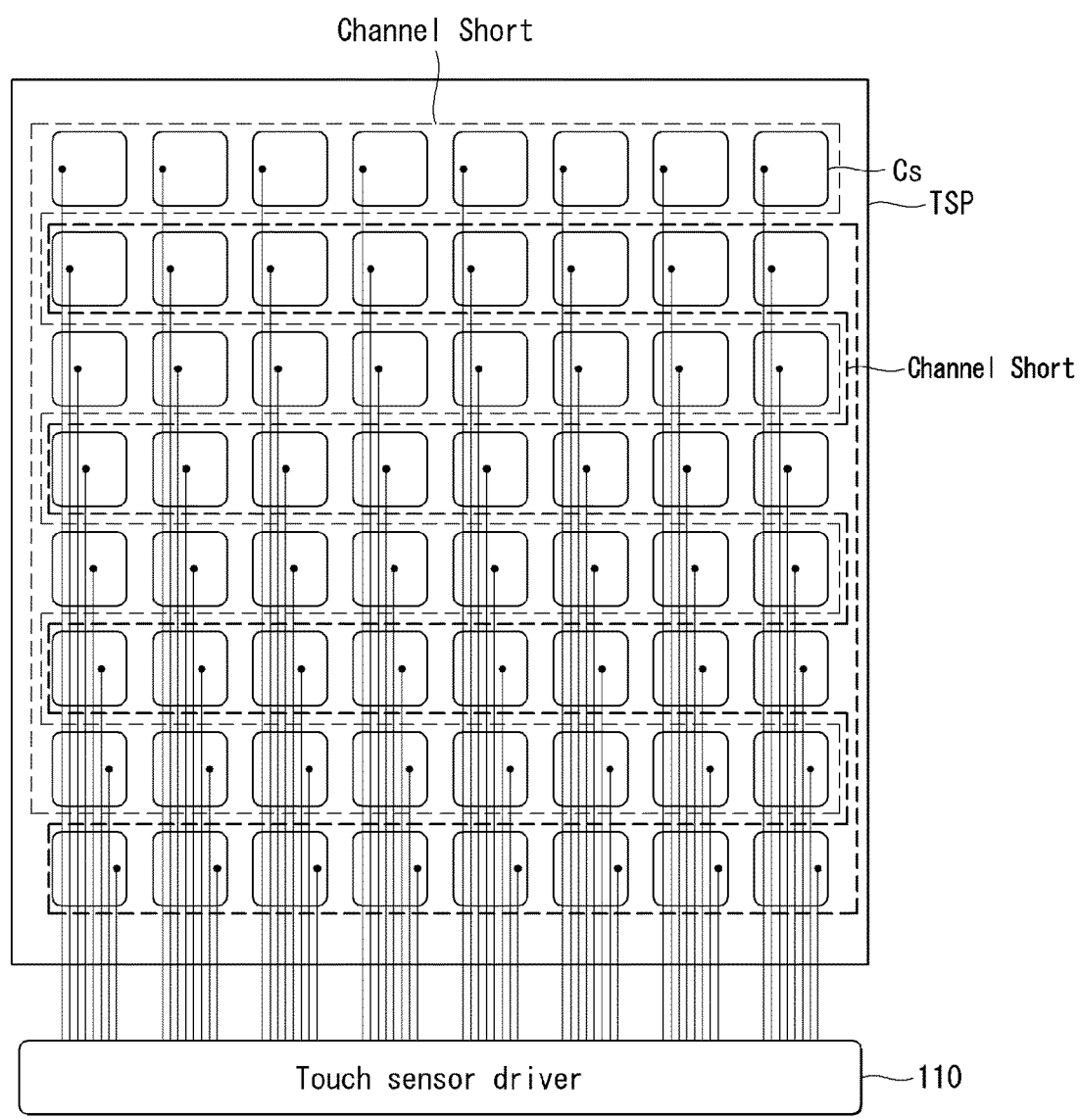
Figure 11D:
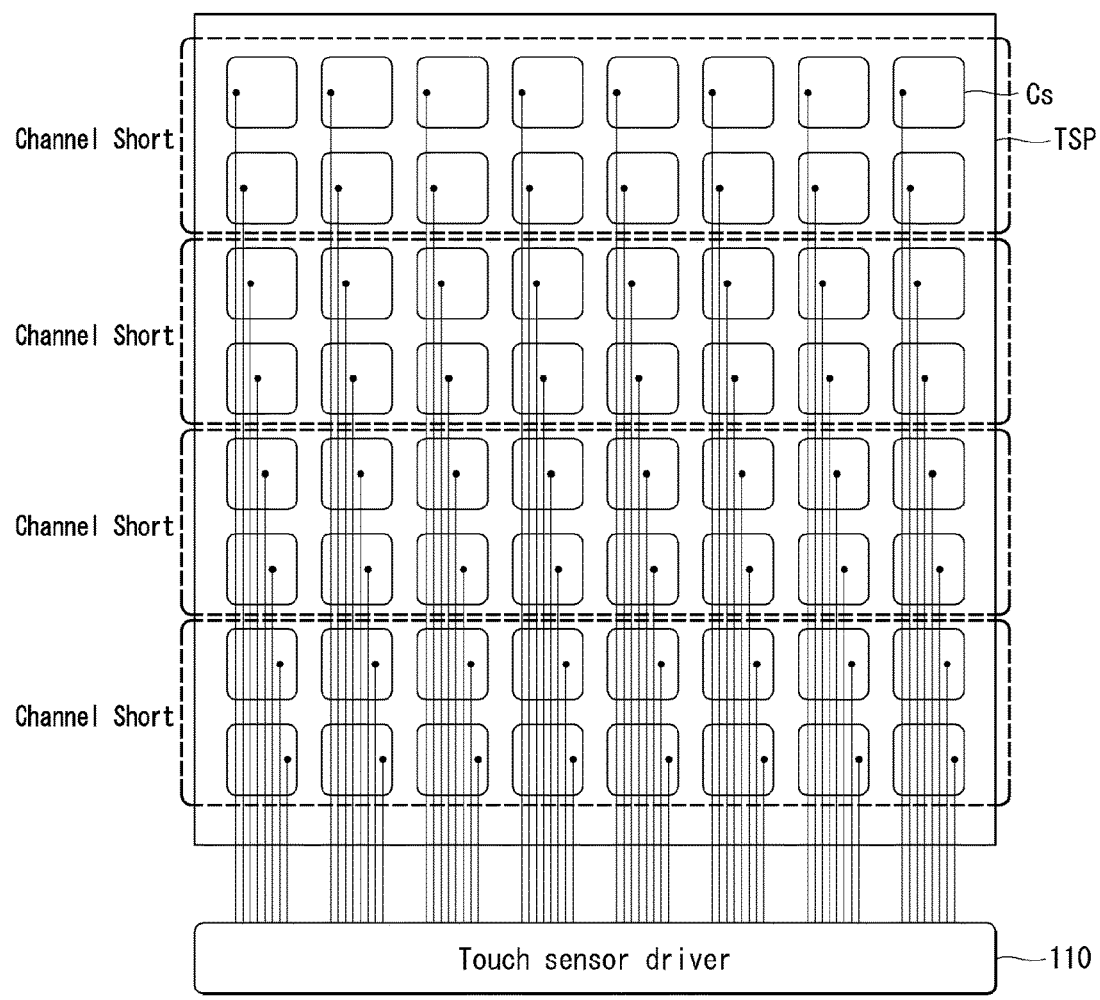
Figure 11E:
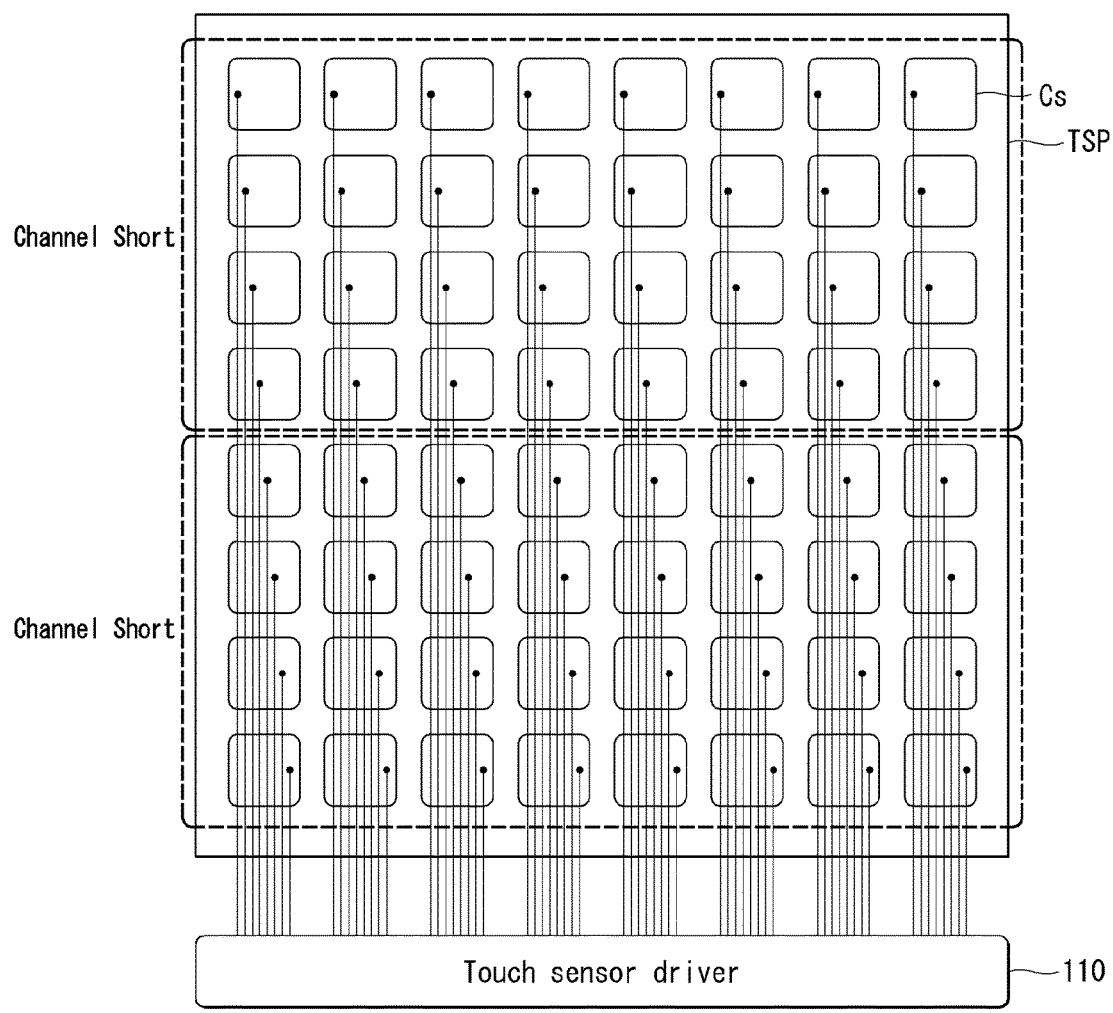
Figure 11F:
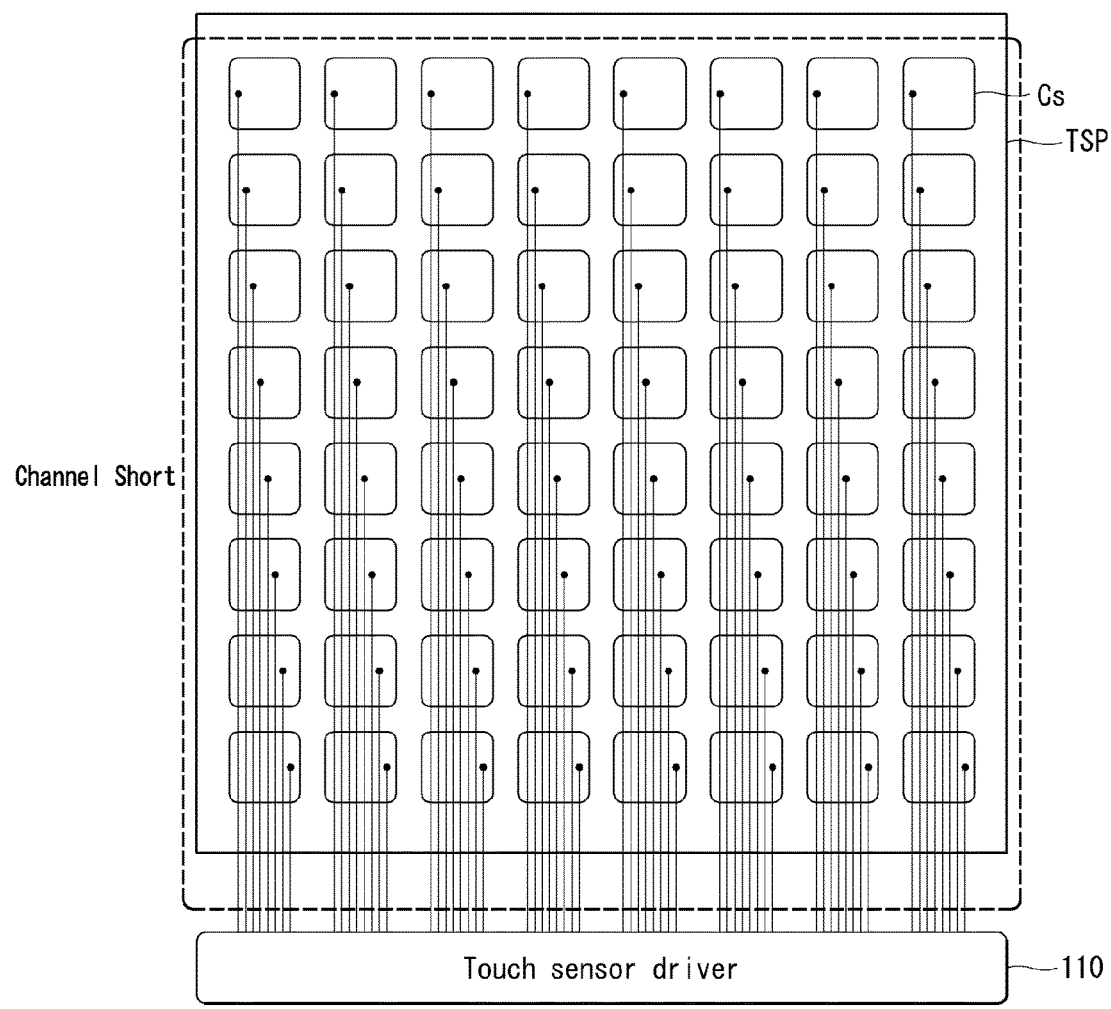
Figure 11G:
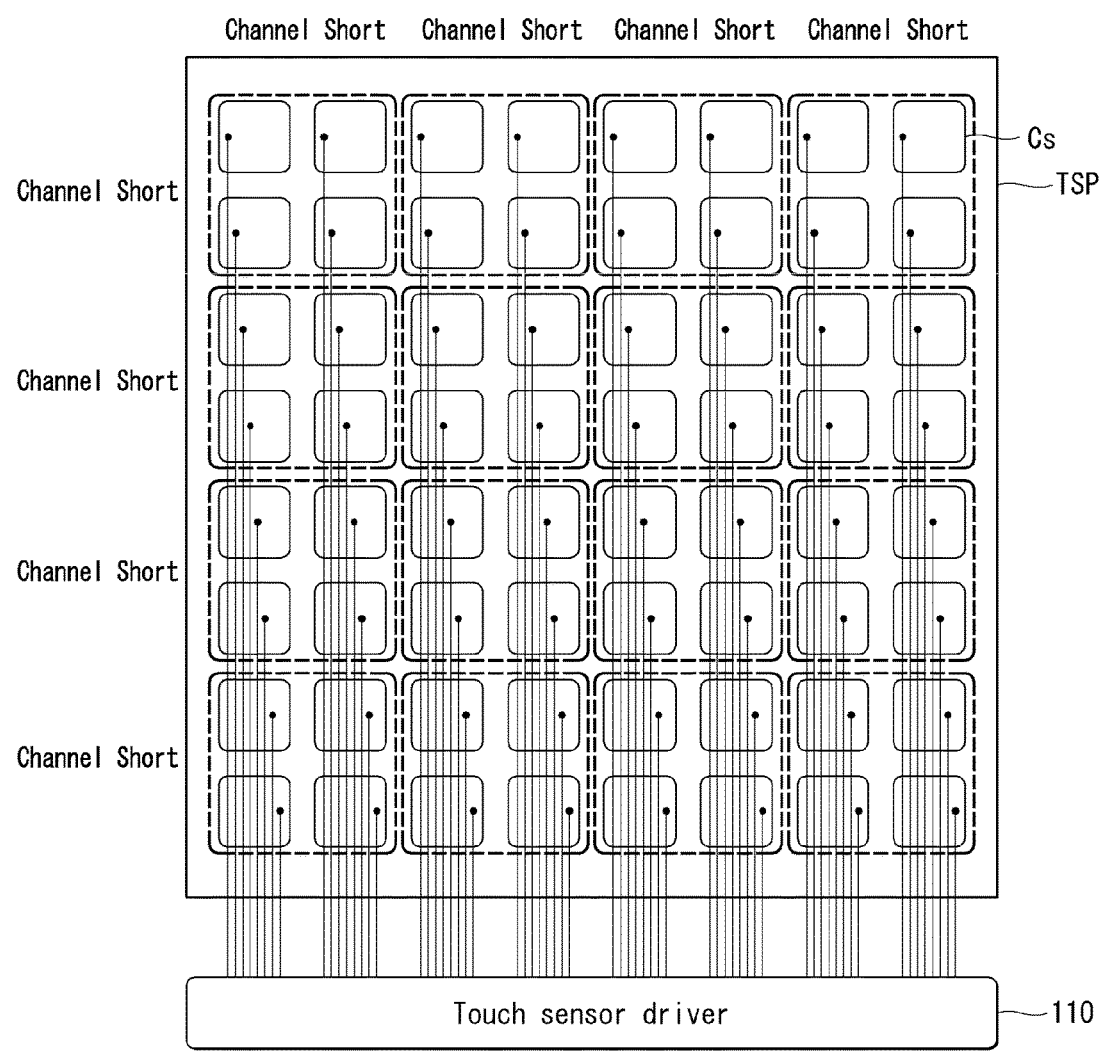

In FIGS. 12 and 13, MUX[1] to MUX[8] are on/off-timings of first to eighth MUX channels CH1 to CH8. When the MUX[1] to MUX[8] are at a high level, the sensor line 111 of the corresponding MUX channel is connected to the sensing unit 113. FIG. 12 illustrates an example where MUX channels connected to the touch sensors Cs of an odd-numbered row of the touch screen TSP are simultaneously turned on, and then MUX channels connected to the touch sensors Cs of an even-numbered row of the touch screen TSP are simultaneously turned on as shown in FIG. 11C. The plurality of sensor lines 111 are short-circuited through the simultaneously turned-on MUX channels and are connected to the channels of the sensing unit 113. FIG. 13 illustrates an example where all of MUX channels of the touch screen TSP are simultaneously turned on as shown in FIG. 11F. The control method of the multiplexer 112 is not limited to FIGS. 12 and 13. The touch sensor controller 114 may control the multiplexer 112 to connect the plurality of touch sensors Cs to the sensing unit 113 in various forms as shown in FIGS. 11A to 11G. When all the MUX channels are simultaneously short-circuited in the noise measurement, the LFD signal may be applied to the sensor lines 111 which are not connected to the sensing unit 113.

Figure 14:
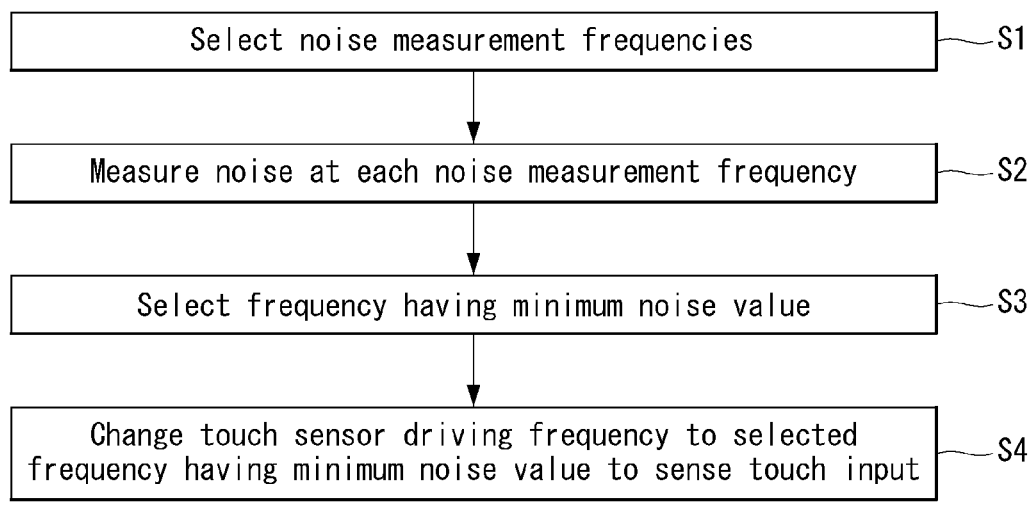
FIG. 14 is a flow chart illustrating in stages a control procedure of a method for measuring noise, according to an embodiment.
Figure 15A:
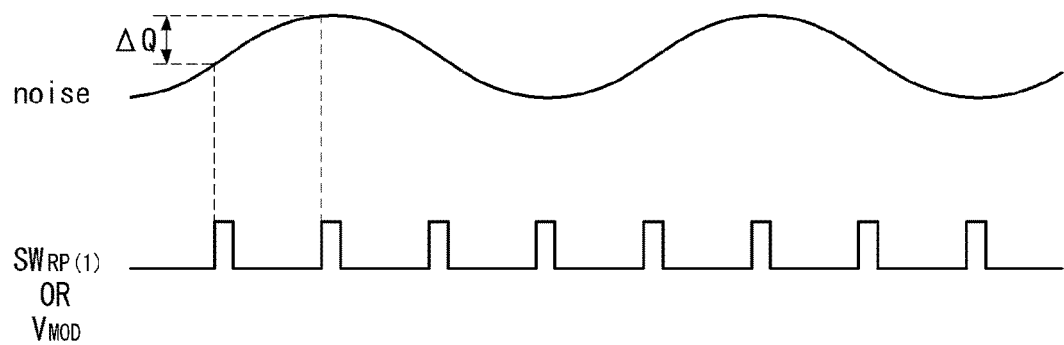
FIGS. 15A to 15C illustrate noise measured depending on a change in a touch sensor driving frequency, according to an embodiment.
Figure 15B:
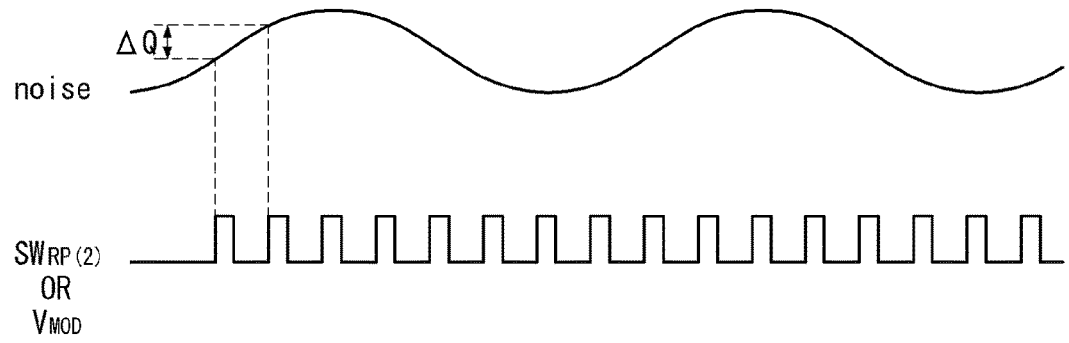
Figure 15C:
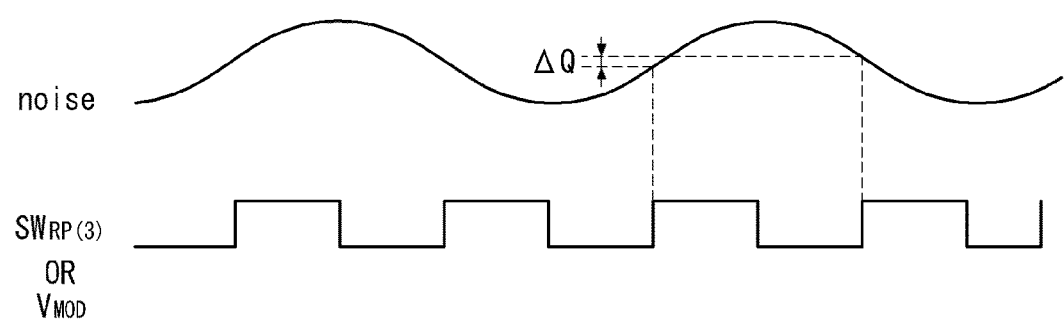

FIG. 14 is a flow chart illustrating in stages a control procedure of a method for measuring noise according to an embodiment. FIGS. 15A to 15C illustrate noise measured depending on a change in a touch sensor driving frequency.

Referring to FIG. 14 and FIGS. 15A to 15C, the touch sensor controller 114 selects noise measurement frequencies in step S1, and measures noise at each of the selected frequencies during the noise measurement portion TT2 in step S2. Embodiments can measure noise in each frame period and can measure noise of the touch sensors once every specific time interval, for example, every several seconds. The noise measurement frequency is an operating frequency of the sensing unit 113 or a frequency of the touch sensor driving signal $V_{MOD}$ applied to touch electrodes for the noise measurement.

The touch sensor controller 114 stores noise values measured at each of the noise measurement frequencies in a memory and selects a frequency having a minimum noise value among the noise measuring frequencies in step S3. The touch sensor controller 114 changes the touch sensor driving frequency to the selected frequency having the minimum noise value and senses a touch input during the touch input sensing portion TT1 in step S4.

A noise level of an external environment flowing in the touch sensors may vary depending on the frequency of the noise and the touch sensor driving frequency. For example, as shown in FIGS. 15A to 15C, a charge amount ΔQ of the noise introduced from the external environment when the touch sensor driving frequency is $SW_{RP(1)}$ is more than a charge amount ΔQ at the touch sensor driving frequencies of $SW_{RP(2)}$ and $SW_{RP(3)}$. In this instance, embodiments change the touch sensor driving frequency to $SW_{RP(2)}$ or $SW_{RP(3)}$ and drive the touch sensors.

Figure 16:
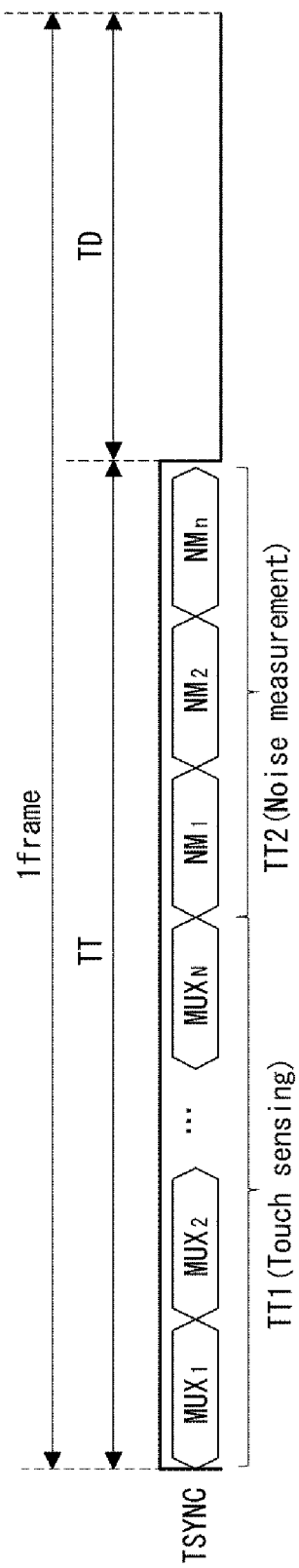
FIGS. 16 and 17 illustrate various examples of a noise measurement portion, according to an embodiment.
Figure 17:
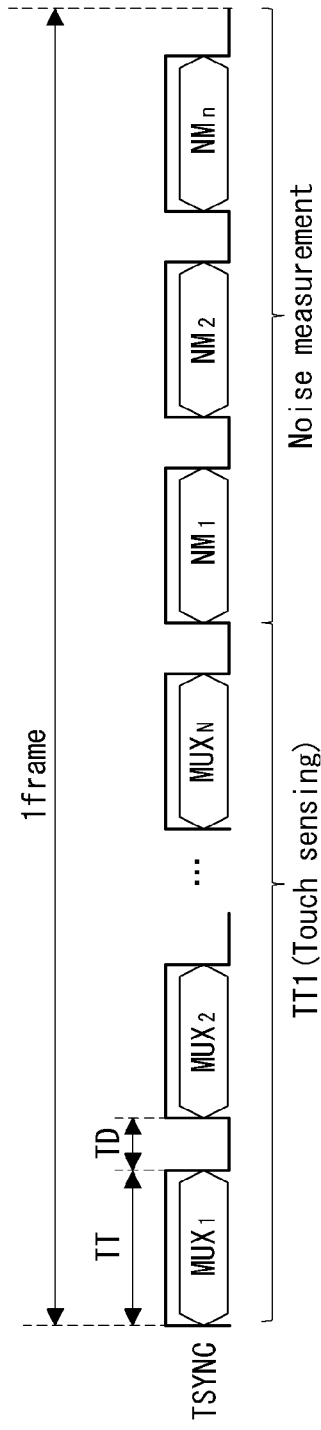

FIGS. 16 and 17 illustrate various examples of a noise measurement portion.

As shown in FIG. 16, one frame period may be time-divided into a display period TD and a touch sensor driving period TT. As shown in FIG. 17, the display period TD may be divided into a plurality of display periods within one frame period, and the touch sensor driving period TT may be arranged between the divided display periods TD. In FIGS. 16 and 17, "MUX1 to MUXN" are MUX channels sequentially selected during a touch input sensing portion TT1 of the touch sensor driving period TT, and "NM1 to NMn" are N MUX channels simultaneously connected to the sensing unit 113 during a noise measurement portion TT2 of the touch sensor driving period TT, where N is a positive integer equal to or greater than 2. The noise measurement frequency at each of the NM1 to NMn may be generated as a different frequency. A method of changing the frequency may be performed by increasing or reducing the frequency by a predetermined magnitude, for example, by 10 kHz in a range of 50 kHz to 200 kHz. For example, the frequency may be changed to 50 kHz at NM1, 60 kHz at NM2, 200 kHz at NMn, in the noise measurement portion TT2.

In some embodiments, previously selected frequencies may be selected as frequencies of the NM1 to NMn. For example, the frequency may be changed to 50 kHz at NM1, 80 kHz at NM2, 90 kHz at NM3, 100 kHz at NM4, 120 kHz at NM5, . . . , 130 kHz at NMn. At least one of the frequencies of the noise measurement portion TT2 includes a frequency equal to the touch sensor driving frequency of the touch input sensing portion TT1.

The time for measuring noise of all the touch sensors at one frequency at each of the NM1 to NMn may vary depending on the number of MUX channels simultaneously connected to the sensing unit 113 in the noise measurement portion TT2. One noise determination period NMP, in which different noise measurement frequencies for the noise measurement are applied to the sensor lines 111 through the multiplexer 112 and noise is measured at each frequency, may be longer than one frame period as shown in FIGS. 18A to 18C and FIGS. 19 and 20.

Figure 18A:
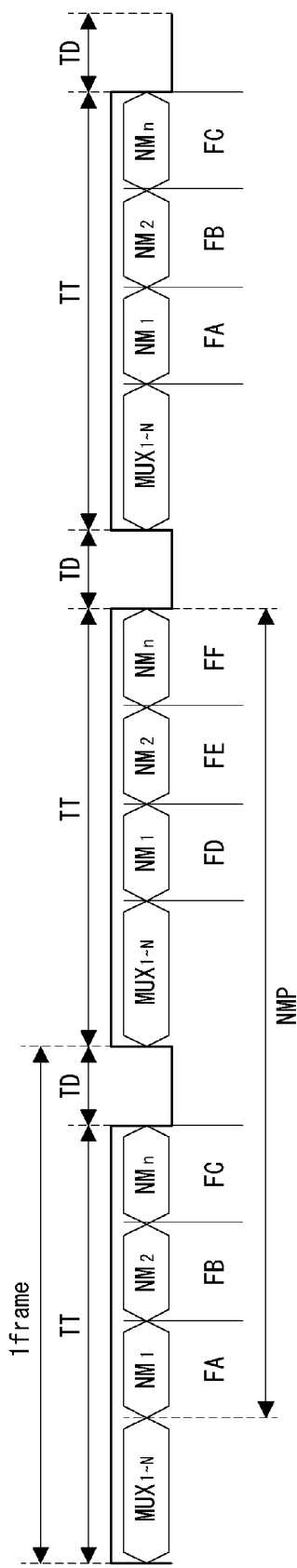
FIGS. 18A to 18C illustrate an example where a period, in which a noise of touch sensors at one frequency is measured, varies depending on the number of MUX channels simultaneously connected to a sensing unit during a noise measurement portion, according to an embodiment.
Figure 18B:
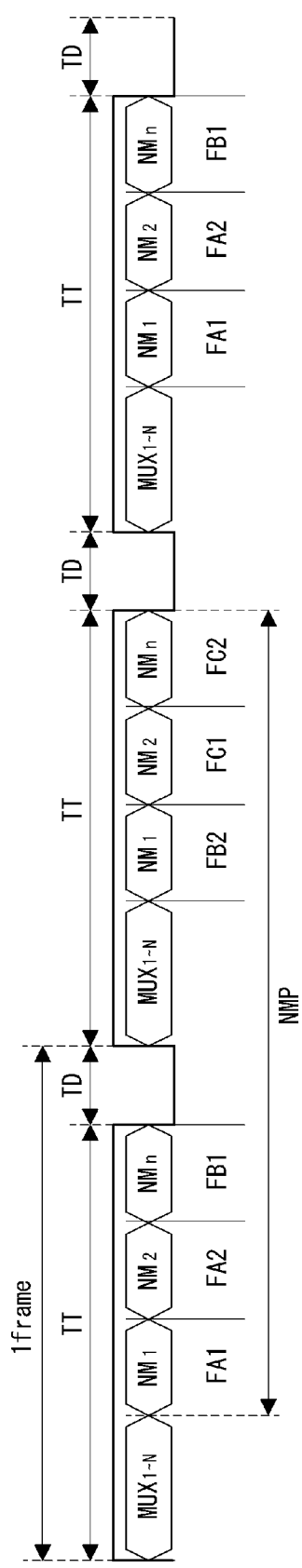
Figure 18C:
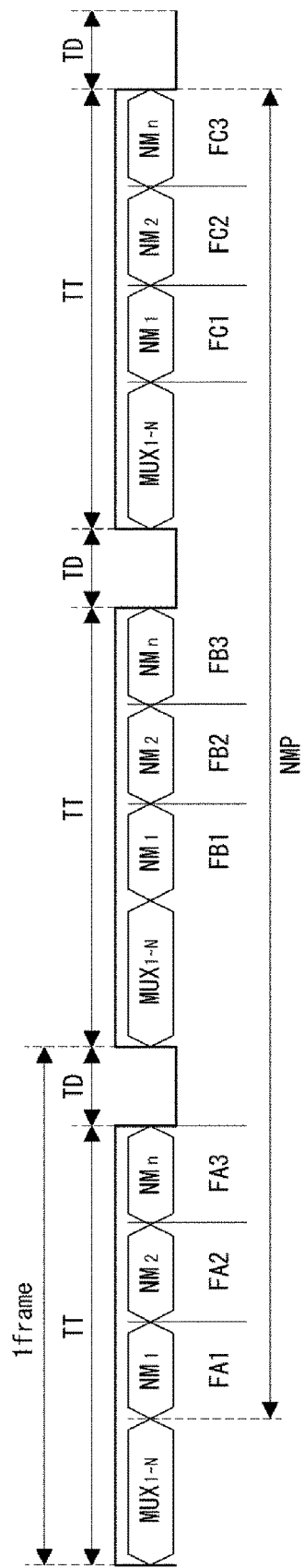

In FIGS. 18A to 18C, FA (e.g., FA1 to FA3), FB (e.g., FB1 to FB3), and FC (e.g., FC1 to FC3) are touch sensor driving frequencies generated as different noise measurement frequencies for the noise measurement. As shown in FIG. 18A, when all the MUX channels are connected to the sensing unit 113 in one sub-noise measurement portion NM, noise of all the touch sensors is measured at a specific frequency FA during one sub-noise measurement portion NM1. As shown in FIG. 18B, when one half of all the MUX channels is connected to the sensing unit 113 in one sub-noise measurement portion NM, noise of all the touch sensors is measured at specific frequencies FA1 and FA2 during two sub-noise measurement portions NM1 and NM2. As shown in FIG. 18C, when ⅓ of all the MUX channels is connected to the sensing unit 113 in one sub-noise measurement portion NM, noise of all the touch sensors is measured at specific frequencies FA1, FA2, and FA3 during three sub-noise measurement portions NM1, NM2, and NMn. In FIGS. 18A to 18C, the noise determination period NMP is one cycle where the same frequency among a plurality of previously selected noise measurement frequencies is repeated. The noise of the touch sensors is measured at each of all of previously selected frequencies during the noise determination period NMP, and the presence or absence of noise is determined based on the comparison of the noises at the noise measurement frequencies. The noise determination period NMP may be longer than one frame period. However, embodiments are not limited thereto.

As described above, a method of driving the touch sensors according to an embodiment simultaneously connects the sensor lines 111 of the touch sensors Cs to the sensing unit 113 during the noise measurement portion TT2. The driving method drives the sensing unit 113 at previously selected noise measurement frequencies in a state where the sensor lines 111 are simultaneously connected to the sensing unit 113, or applies a signal of the noise measurement frequencies to the sensor lines 111, thereby measuring noise of the touch sensors Cs at each of the noise measurement frequencies. The noise measurement portion TT2 includes a plurality of sub-noise measurement portions NM1 to NMn. Noise measurement frequencies of at least two of the sub-noise measurement portions NM1 to NMn are different from each other. One cycle NMP, in which the same frequency among the noise measurement frequencies is repeated, is equal to or greater than one frame period of the display device.

Figure 19:
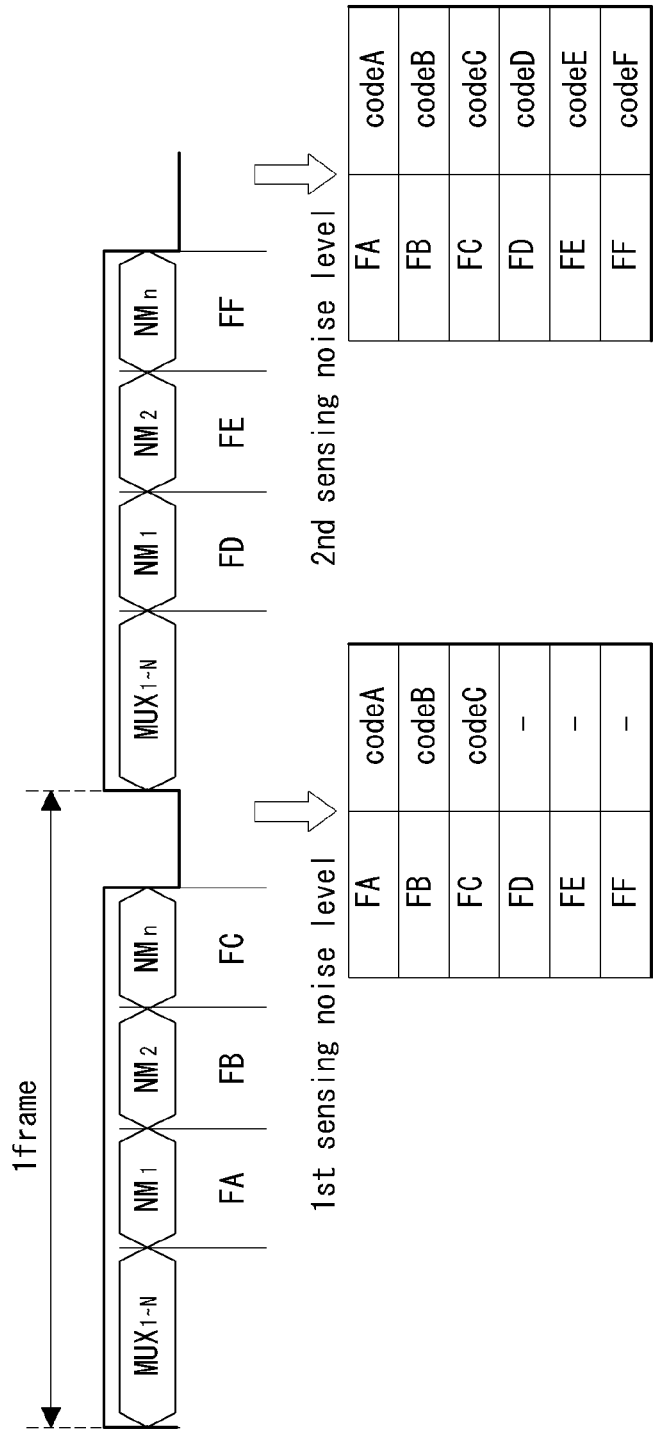
FIGS. 19 and 20 illustrate various examples of a method for measuring noise.
Figure 20:
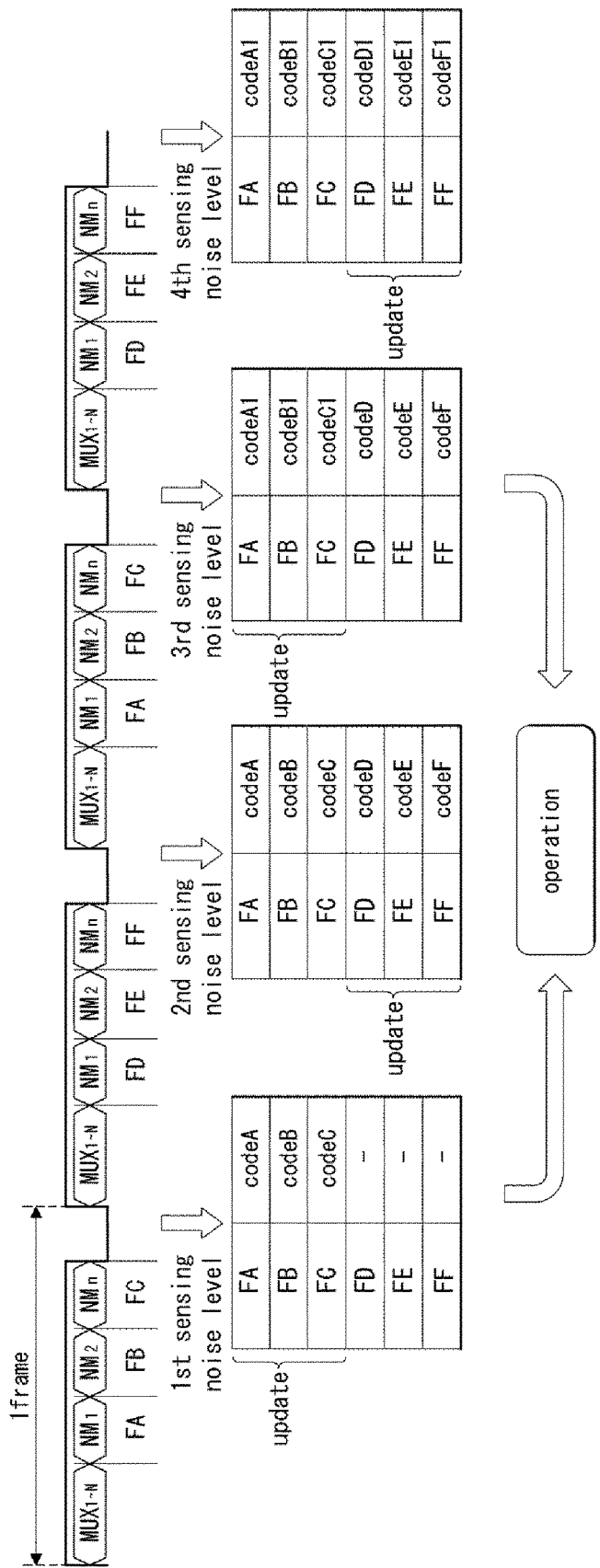

FIGS. 19 and 20 illustrate various examples of a method for measuring noise. In FIGS. 19 and 20, FA to FF are touch sensor driving frequencies for measuring noise of the touch sensors Cs in the noise measurement portion TT2, and CodeA to CodeF are noise measurement values and are obtained as digital code values of noise output from the ADC at each of the touch sensor driving frequencies FA to FF.

In one embodiment a noise level is compared with a predetermined reference value and the presence or the absence of noise is determined depending on a result of comparison. One reference value or a plurality of reference values may be used. For example, the reference value may be selected as a different value depending on an operation mode of the display device such as a standby mode or a normal mode, and may be selected as a different value depending on an ambient temperature. The reference value may be updated with a user input. The standby mode is an operation mode in which only minimal circuit is driven to reduce power consumption. A luminance of the standby mode can be controlled to be less than a luminance of the normal mode. In the normal mode, all of circuits are normally driven to reproduce an input image and sense a touch input.

FIG. 19 illustrates a method of comparing an absolute value of a noise measurement value with a reference value. The reference value may be divided into an upper limit value and a lower limit value. When the upper limit value and the lower limit value of the reference value are set to "2047+10" and "2047−10", respectively, it is determined that there is no noise when the following Equation is satisfied: 2047−10<noise measurement values CodeA to CodeF <2047+10. When the noise measurement values CodeA to CodeF are equal to or less than "2047−10" or equal to or greater than "2047+10", it is determined that noise is present. The touch sensor controller 114 stores and arranges noise measurement values measured at each of the touch sensor driving frequencies FA to FF in a memory and selects a frequency having a minimum noise measurement value among the noise measurement values. The touch sensor controller 114 changes the touch sensor driving frequency to the frequency having the minimum noise measurement value when noise is present.

FIG. 20 illustrates a method of calculating noise measurement values successively measured at each frequency and comparing a result of calculation with a reference value. For example, when a noise measurement value CodeA of a frequency A(FA) measured in a first frame period and a noise measurement value CodeA1 of the frequency A(FA) measured in a second frame period are present, the noise measurement value of the frequency A(FA) may be obtained as a result of subtraction calculation of |codeA−codeA1| or |average (codeA, codeA1) −codeA2|, and the like. Various calculation methods other than the subtraction method may be used. The reference value may be divided into an upper limit value and a lower limit value. In the subtraction method, the upper limit value and the lower limit value of the reference value may be set to 10 and 0, respectively. When the following Equation is satisfied: 0<noise measurement value (|codeA−codeA1 or |average (codeA, codeA1)−codeA2|)<10, it is determined that there is no noise. On the other hand, when noise measurement value (|codeA −codeA1| or |average (codeA, codeA1)−codeA2|) is equal to or greater than 10, it is determined that noise is present. When the noise is present, the touch sensor driving frequency is changed to a frequency having a minimum noise measurement value among previously measured values.

Figure 21:
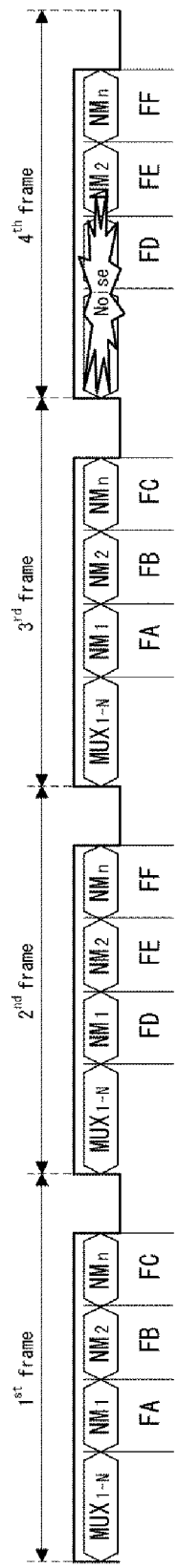
FIG. 21 illustrates an example where a frequency is changed depending on a result of noise measurement, according to an embodiment.

FIG. 21 illustrates an example where a frequency is changed depending on a result of noise measurement.

Referring to FIG. 21, one or more frequencies of frequencies of a noise measurement portion include a frequency equal to the touch sensor driving frequency of the touch input sensing portion TT1. When it is determined that noise is present as a result of noise measurement at a frequency equal to the touch sensor driving frequency of the touch input sensing portion TT1, the touch sensor driving frequency is changed to a frequency having a minimum noise measurement value. In an example of FIG. 21, when noise increases at a current touch sensor driving frequency in a fourth frame period, the current touch sensor driving frequency is changed to a frequency having a minimum noise measurement value among noise measurement values that have been previously stored in first to third frame periods.

Figure 22:
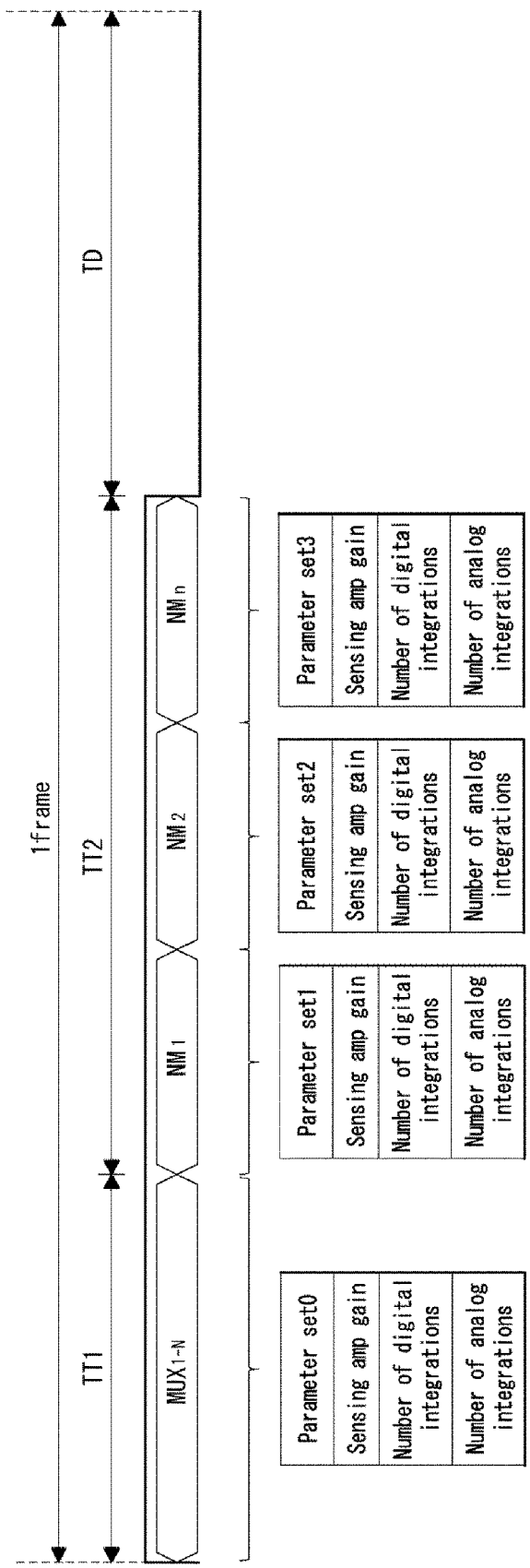
FIG. 22 illustrates an example where a parameter is independently set in a touch input sensing portion and a noise measurement portion, according to an embodiment.

FIG. 22 illustrates an example where a parameter is independently set in a touch input sensing portion and a noise measurement portion.

Referring to FIG. 22, according to embodiments as described above, the number of MUX channels simultaneously connected to the sensing unit 113 during the noise measurement portion TT2 is more than the number of MUX channels simultaneously connected to the sensing unit 113 during the touch input sensing portion TT1. When the sensing unit 113 is operated during the noise measurement portion TT2 under the same driving conditions as the touch input sensing portion TT1, a noise measurement value is saturated due to a difference in a method for connecting the MUX channels in the portions TT1 and TT2. Hence, a measurable noise level is reduced.

The embodiment independently sets a parameter defining operating conditions of the sensing unit 113 in each of the touch input sensing portion TT1 and the noise measurement portion TT2, thereby optimizing sensitivity of a touch sensing value sensed in the touch input sensing portion TT1 and sensitivity of a noise measurement value measured in the noise measurement portion TT2. In an example of FIG. 22, "Parameter set0" is a parameter of the touch input sensing portion TT1, and "Parameter set1", "Parameter set2", and "Parameter set3" are parameters of the noise measurement portion TT2. Each parameter defines a gain of the variable gain amplifier PREAMP, the number of analog integrations, and the number of digital integrations. The gain of the variable gain amplifier PREAMP and the number of analog integrations in the noise measurement portion TT2 may be less than those in the touch input sensing portion TT1. Further, the number of digital integrations in the noise measurement portion TT2 may be greater than that in the touch input sensing portion TT1.

Figure 23:
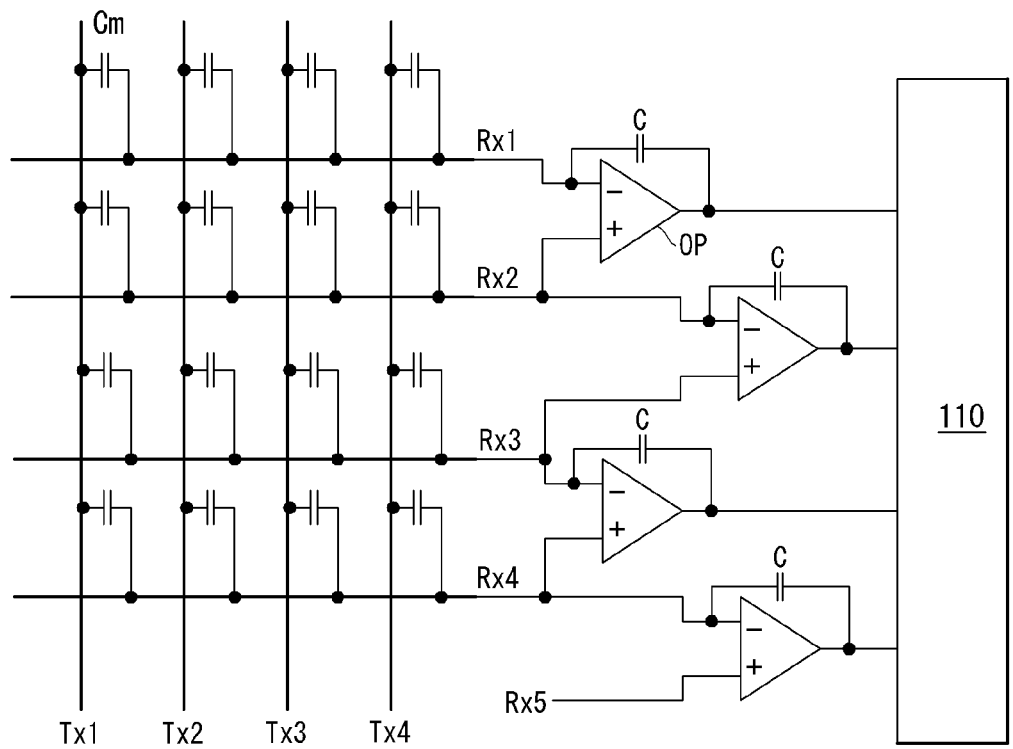
FIGS. 23 and 24 illustrate a normal touch input sensing operation of mutual capacitance touch sensors, according to an embodiment.
Figure 24:
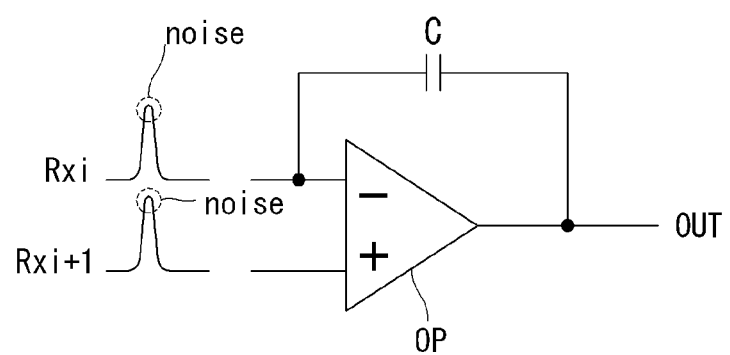
Figure 25:
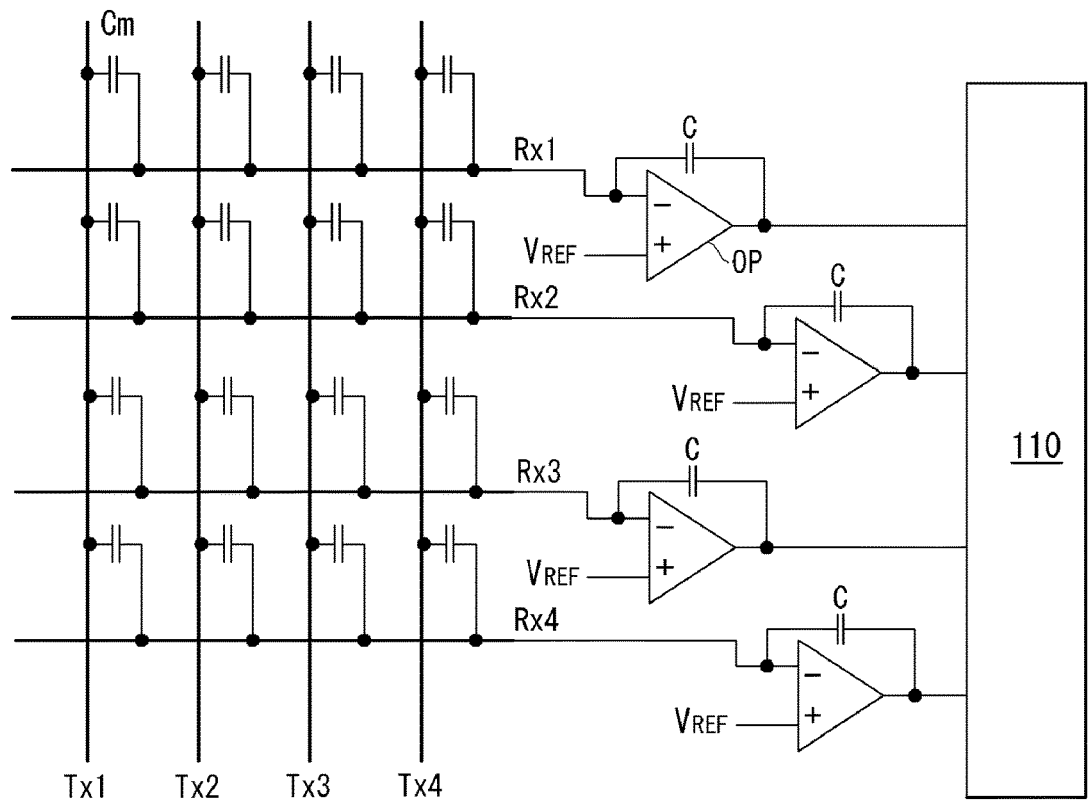
FIG. 25 illustrates a method for measuring noise of mutual capacitance touch sensors, according to an embodiment.

Embodiments have been described focusing on the self-capacitance touch sensors Cs as described above, but are not limited thereto. FIGS. 23 to 25 illustrate mutual capacitance touch sensors.

FIGS. 23 and 24 illustrate a normal touch input sensing operation of mutual capacitance touch sensors.

Referring to FIGS. 23 and 24, the sensor lines 111 include Tx lines Tx1 to Tx4 and Rx lines Rx1 to Rx4 which are separated from each other with an insulating layer interposed between the Tx lines and the Rx lines. The Tx lines Tx1 to Tx4 intersect the Rx lines Rx1 to Rx4. Mutual capacitance touch sensors Cm are formed between the Tx lines Tx1 to Tx4 and the Rx lines Rx1 to Rx4.

The touch sensor driver 110 supplies a touch sensor driving signal to the Tx lines Tx1 to Tx4, receives an amount of charge of the touch sensors Cm received through the Rx lines Rx1 to Rx4 in synchronization with the touch sensor driving signal, and amplifies and integrates the amount of the charge. When a touch input is generated through a finger or a conductor, an amount of charge of the touch sensors is reduced. Thus, the mutual capacitance touch sensors may determine a touch input based on a difference between an amount of charge before the touch input and an amount of charge after the touch input.

Differential amplifiers OP may be connected to the Rx lines Rx1 to Rx4. The sensing unit 113 may receive a signal amplified by the differential amplifier OP connected to two adjacent Rx lines. An output terminal of each differential amplifier OP is connected to an inverting input terminal (−) of each differential amplifier OP via a capacitor C. Each differential amplifiers OP amplifies a difference between an $i^{th}$ touch sensor signal input to the inverting input terminal (−) and an $(i+1)^{th}$ touch sensor signal input to a non-inverting input terminal (+) of the differential amplifiers OP and outputs an sensor signal, where i is a positive integer. As shown in FIG. 24, the differential amplifier OP amplifies a difference between signals received through the adjacent Rx lines so that a signal component becomes greater than noise. Accordingly, the SNR can be improved.

The differential amplifiers OP may reduce noise received through the touch sensors Cm during the touch input sensing portion TT1, but makes the noise measurement more difficult.

Figure 26:
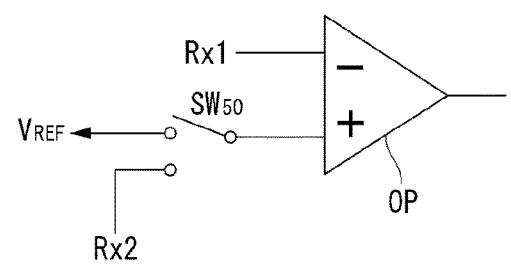
FIG. 26 illustrates a switch connected to a differential amplifier, according to an embodiment.

As shown in FIGS. 25 and 26, the embodiment supplies a predetermined reference voltage $V_{REF}$ to the non-inverting terminal (+) of each differential amplifier OP, in order to prevent a phenomenon in which noise becomes too small when the noise is measured. As shown in FIG. 26, a switch $SW_{50}$ may be connected to the non-inverting input terminal (+) of the differential amplifier OP. The switch $SW_{50}$ connects the Rx line to the non-inverting input terminal (+) of the differential amplifier OP in the touch input sensing portion TT1 and supplies a DC reference voltage $V_{REF}$ to the non-inverting input terminal (+) of the differential amplifier OP in the noise measurement portion TT2. The reference voltage $V_{REF}$ may be set to 3.3 V to 12 V.

The number of MUX channels simultaneously connected to the sensing unit 113 using the multiplexer 112 is increased when the noise is measured. As a result, the number of MUX channels simultaneously connected to the sensing unit 113 during the noise measurement portion TT2 is increased. During the noise measurement portion TT2, the touch sensor driving signal may be simultaneously applied to the Tx lines Tx1 to Tx4 as shown in FIG. 9, or may not be applied as shown in FIG. 10. Even in the embodiment, a parameter setting value may be differently set in the touch input sensing portion TT1 and the noise measurement portion TT2.

As described above, the number of channels of the multiplexer simultaneously connected to the sensing unit during the noise measurement portion is controlled to be more than the number of channels of the multiplexer simultaneously connected to the sensing unit during the touch input sensing portion. Further, a parameter defining the operating conditions of the sensing unit in each of the touch input sensing portion and the noise measurement portion are independently set, thereby optimizing sensitivity of a touch sensing value sensed in the touch input sensing portion and sensitivity of a noise measurement value measured in the noise measurement portion. As a result, the embodiments can rapidly and more accurately measure the noise in the entire touch screen.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A method of driving a touch sensor comprising:
connecting sensor lines of a plurality of touch sensors to a sensing unit during a noise measurement portion;
driving the sensing unit at previously selected noise measurement frequencies in a state where the sensor lines are connected to the sensing unit or applying a signal of the noise measurement frequencies to the sensor lines to measure a noise of the touch sensors at each of the noise measurement frequencies, driving the sensing unit at a first frequency or applying a signal of the first frequency to the sensor lines during a touch input sensing portion and performing an analog amplification for amplifying a touch sensor signal with an amplification gain, an analog integration for integrating an analog amplification signal, a digital conversion for converting an analog integration signal into digital data, and a digital integration for integrating the digital data; and driving the sensing unit at the noise measurement frequencies including the first frequency or applying a signal of the noise measurement frequencies including the first frequency to the sensor lines during the noise measurement portion and performing the analog amplification, the analog integration, the digital conversion, and the digital integration at each of the noise measurement frequencies, wherein the noise measurement portion includes a plurality of sub-noise measurement portions, wherein noise measurement frequencies in at least two of the sub-noise measurement portions are different from each other, and wherein one cycle, in which a same frequency among the noise measurement frequencies is repeated, is equal to or greater than one frame period of a display device, wherein a number of channels of the multiplexer simultaneously connected to the sensing unit during the noise measurement portion is more than a number of channels of the multiplexer simultaneously connected to the sensing unit during the touch input sensing portion, wherein at least one of the amplification gain, a number of analog integrations, and a number of digital integrations has different values in the touch input sensing portion and the noise measurement portion.

2. The method of claim 1, wherein the sensor lines are simultaneously connected to the sensing unit through a multiplexer between the sensor lines and the sensing unit.

3. The method of claim 2, wherein when all channels of the multiplexer are not simultaneously connected to the sensing unit in the noise measurement portion, an AC signal is applied to the sensor lines that are not connected to the sensing unit.

4. The method of claim 2, wherein when all of channels of the multiplexer are not simultaneously connected to the sensing unit in the noise measurement portion, the signal of the noise measurement frequencies is applied to the sensor lines that are connected to the sensing unit and an AC signal is applied to the sensor lines that are not connected to the sensing unit.

5. The method of claim 1, further comprising:
comparing a noise value measured at each of the noise measurement frequencies during the noise measurement portion with a predetermined reference value to change the first frequency to a frequency having a minimum noise responsive to determining that a noise is present based on the comparison.

6. The method of claim 5, wherein the amplification gain in the noise measurement portion is less than the amplification gain in the touch input sensing portion.

7. The method of claim 1, wherein a number of analog integrations in the noise measurement portion is less than a number of analog integrations in the touch input sensing portion.

8. The method of claim 7, wherein a number of digital integrations in the noise measurement portion is more than a number of digital integrations in the touch input sensing portion.

9. A method of driving a display device comprising:
writing data of an input image to pixels of a display panel during a display period;

driving a sensing unit at previously selected noise measurement frequencies or applying a signal of the noise measurement frequencies to the sensor lines in a state where sensor lines of touch sensors are connected to the sensing unit to measure a noise of the touch sensors at each of the noise measurement frequencies during a noise measurement portion, driving the sensing unit at a first frequency or applying a signal of the first frequency to the sensor lines during a touch input sensing portion and performing an analog amplification for amplifying a touch sensor signal with an amplification gain, an analog integration for integrating an analog amplification signal, a digital conversion for converting an analog integration signal into digital data, and a digital integration for integrating the digital data; and driving the sensing unit at the noise measurement frequencies including the first frequency or applying a signal of the noise measurement frequencies including the first frequency to the sensor lines during the noise measurement portion and performing the analog amplification, the analog integration, the digital conversion, and the digital integration at each of the noise measurement frequencies, wherein noise measurement frequencies in at least two of sub-noise measurement portions are different from each other, and wherein one cycle, in which a same frequency among the noise measurement frequencies is repeated, is equal to or greater than one frame period of the display device, wherein a number of channels of the multiplexer simultaneously connected to the sensing unit during the noise measurement portion is more than a number of channels of the multiplexer simultaneously connected to the sensing unit during the touch input sensing portion, wherein at least one of the amplification gain, a number of analog integrations, and a number of digital integrations has different values in the touch input sensing portion and the noise measurement portion.

10. The method of claim 9, wherein the sensor lines are simultaneously connected to the sensing unit through a multiplexer between the sensor lines and the sensing unit.

11. A touch sensor circuit comprising:
a touch sensor driver configured to drive a sensing unit at previously selected noise measurement frequencies or apply a signal of the noise measurement frequencies to the sensor lines in a state where sensor lines of touch sensors are connected to the sensing unit during a noise measurement portion and measure a noise of the touch sensors at each of the noise measurement frequencies, wherein the noise measurement portion includes a plurality of sub-noise measurement portions, wherein noise measurement frequencies in at least two of the sub-noise measurement portions are different from each other, and wherein one cycle, in which the same frequency among the noise measurement frequencies is repeated, is equal to or greater than one frame period of the display device, wherein the touch sensor driver includes:
a multiplexer configured to select the sensor lines;
a sensing unit including a variable gain amplifier connected to an output terminal of the multiplexer;

an analog integrator connected to an output terminal of the variable gain amplifier;

an analog-to-digital converter connected to an output terminal of the analog integrator; and a digital integrator connected to an output terminal of the analog-to-digital converter, wherein the sensing unit is driven at a first frequency or applies a signal of the first frequency to the sensor lines during a touch input sensing portion, wherein the sensing unit is driven at the noise measurement frequencies including the first frequency or applies a signal of the noise measurement frequencies including the first frequency to the sensor lines during the noise measurement portion, wherein a number of channels of the multiplexer simultaneously connected to the sensing unit during the noise measurement portion is more than a number of channels of the multiplexer simultaneously connected to the sensing unit during the touch input sensing portion, and wherein at least one of the amplification gain of the variable gain amplifier, a number of integrations of the analog integrator, and a number of integrations of the digital integrator has different values in the touch input sensing portion and the noise measurement portion.

12. The touch sensor circuit of claim 11, wherein the touch sensor driver compares a noise value measured at each of the noise measurement frequencies during the noise measurement portion with a predetermined reference value and changers a touch sensor driving frequency to a frequency having a minimum noise value responsive to determining that a noise is present based on the comparison, and wherein the touch sensor driving frequency is a frequency of a touch sensor driving signal for charging charges of the touch sensors during the touch input sensing portion.

13. The touch sensor circuit of claim 11, wherein the amplification gain in the noise measurement portion is less than the amplification gain in the touch input sensing portion.

14. The touch sensor circuit of claim 11, wherein a number of integrations of the analog integrator in the noise measurement portion is less than a number of integrations of the analog integrator in the touch input sensing portion.

15. The touch sensor circuit of claim 14, wherein a number of integrations of the digital integrator in the noise measurement portion is more than a number of integrations of the digital integrator in the touch input sensing portion.

16. A display device comprising:

a display panel on which touch sensors and pixels are disposed;

a display panel driver configured to write data of an input image to the pixels of the display panel during a display period; and a touch sensor driver configured to drive a sensing unit at previously selected noise measurement frequencies or apply a signal of the noise measurement frequencies to the sensor lines in a state where sensor lines of the touch sensors are connected to the sensing unit during a noise measurement portion and measure a noise of the touch sensors at each of the noise measurement frequencies, wherein the noise measurement portion includes a plurality of sub-noise measurement portions, wherein noise measurement frequencies in at least two of the sub-noise measurement portions are different from each other, and wherein one cycle, in which the same frequency among the noise measurement frequencies is repeated, is equal to or greater than one frame period of the display device, wherein the touch sensor driver includes:

a multiplexer configured to select the sensor lines;

a sensing unit including a variable gain amplifier connected to an output terminal of the multiplexer;

an analog integrator connected to an output terminal of the variable gain amplifier;

an analog-to-digital converter connected to an output terminal of the analog integrator; and a digital integrator connected to an output terminal of the analog-to-digital converter, wherein the sensing unit is driven at a first frequency or applies a signal of the first frequency to the sensor lines during a touch input sensing portion, wherein the sensing unit is driven at the noise measurement frequencies including the first frequency or applies a signal of the noise measurement frequencies including the first frequency to the sensor lines during the noise measurement portion, wherein a number of channels of the multiplexer simultaneously connected to the sensing unit during the noise measurement portion is more than a number of channels of the multiplexer simultaneously connected to the sensing unit during the touch input sensing portion, wherein at least one of the amplification gain of the variable gain amplifier, a number of integrations of the analog integrator, and a number of integrations of the digital integrator has different values in the touch input sensing portion and the noise measurement portion.

* * * * *